US012274213B2

(12) United States Patent
Cuthbertson et al.

(10) Patent No.: US 12,274,213 B2
(45) Date of Patent: Apr. 15, 2025

(54) HORTICULTURAL HYDROGELS

(71) Applicant: VELOCIGRO INC., Monrovia, CA (US)

(72) Inventors: Timothy Cuthbertson, Monrovia, CA (US); Jonathan Romo, Monrovia, CA (US)

(73) Assignee: VELOCIGRO INC., Monrovia, CA (US)

( * ) Notice: Subject to any disclaimer, the term of this patent is extended or adjusted under 35 U.S.C. 154(b) by 0 days.

(21) Appl. No.: 18/739,871

(22) Filed: Jun. 11, 2024

(65) Prior Publication Data

US 2024/0324530 A1 Oct. 3, 2024

Related U.S. Application Data

(63) Continuation of application No. PCT/US2023/073259, filed on Sep. 1, 2023.

(60) Provisional application No. 63/374,255, filed on Sep. 1, 2022.

(51) Int. Cl.
| | |
|---|---|
| A01G 31/00 | (2018.01) |
| A01G 18/20 | (2018.01) |
| A01G 22/05 | (2018.01) |
| A01G 22/15 | (2018.01) |
| A01G 24/44 | (2018.01) |
| C05G 3/80 | (2020.01) |
| C05G 5/18 | (2020.01) |
| C05G 5/40 | (2020.01) |

(52) U.S. Cl.
CPC ............. *A01G 31/00* (2013.01); *A01G 18/20* (2018.02); *A01G 24/44* (2018.02); *C05G 5/18* (2020.02); *A01G 22/05* (2018.02); *A01G 22/15* (2018.02); *C05G 3/80* (2020.02); *C05G 5/40* (2020.02)

(58) Field of Classification Search
CPC ... C05G 3/80; C05G 3/70; C05G 5/37; C05G 3/60; C05G 1/00; C05G 3/30; C05G 3/50; C05G 5/12; C05G 5/27; C05G 5/18; C05G 5/40; C05G 3/00; C05G 3/44; C05G 5/35; C05G 5/45; C05G 3/40; A01G 24/35; A01G 24/44; A01G 18/20; A01G 22/05; A01G 22/15; A01G 31/00; A01G 24/60; A01G 7/045; A01G 9/08; A01G 9/249
See application file for complete search history.

(56) References Cited

U.S. PATENT DOCUMENTS

| | | |
|---|---|---|
| 7,607,259 B2 | 10/2009 | Savich |
| 11,547,065 B2 | 1/2023 | Landis et al. |
| 2014/0100111 A1 | 4/2014 | Schultz, Sr. et al. |
| 2018/0116137 A1 | 5/2018 | Gasmer et al. |
| 2019/0256770 A1 | 8/2019 | He et al. |
| 2020/0344960 A1 | 11/2020 | Von Rundstedt |
| 2022/0154030 A1 | 5/2022 | Chen et al. |

FOREIGN PATENT DOCUMENTS

| | | |
|---|---|---|
| JP | 6435279 B2 | 12/2018 |
| WO | 2007144894 A1 | 12/2007 |
| WO | 2014140918 A2 | 9/2014 |
| WO | 2023209096 A1 | 11/2023 |

OTHER PUBLICATIONS

Banerjee, Manas R., "Sulfur-Oxidizing Bacteria as a Potential Canola Plant Growth-Promoting Rhizobacteria," Phytochemicals and Health, DL Gustine, HE Flores, eds., 1995, 2 pages, American Society of Plant Physiologists, US.
Brown, Margaret E., "Seed and Root Bacterization," Annual Rev. Phytopathology, 1974, pp. 181-197, vol. 12, Annual Reviews, US.
Gaskins, M.H., et al., "Rhizosphere Bacteria and Their Use to Increase Plant Productivity: A Review," Agriculture, Ecosystems and Environment, 1984/85, pp. 99-116, vol. 12, Elsevier Science Publishers B.V., Amsterdam, NL.
Grayston, Susan J., et al., "Sulfur-oxidizing bacteria as plant growth promoting rhizobacteria for canola," Can. J. Microbiol., 1991, pp. 521-529, vol. 37, Canadian Science Publishing, CA.
Hamdan, Mohd Aiman, et al., "Characterization and property investigation of microcrystalline cellulose (MCC) and carboxymethyl cellulose (CMC) filler on the carrageenan-based biocomposite film," Materials Today: Proceedings, 2021, pp. 56-62, vol. 42, ScienceDirect.com by Elsevier Ltd.
Online newspaper article, "Proterra Ag Inc. launches, introduces HYPERroots product," Vegetable Growers News, Oct. 12, 2021, 5 pages, URL: https://vegetablegrowersnews.com/news/26761/.
Palanivelu, Swarna Devi, et al., "Hydrogel Application in Urban Farming: Potentials and Limitations—A Review," Polymers, Jun. 26, 2022, 18 pages, vol. 14, Article No. 2590, MDPI, Basel, CH.
Rozo, Gladys, et al., "Controlled release fertilizer encapsulated by a κ-carrageenan hydrogel," Polímeros, 2019, pp. 1-7, vol. 29, No. 3, Article e2019033, Ciência e Tecnologiam, BR, URL: https://doi.org/10.1590/0104-1428.02719.
Taparia, Tanvi, et al, "Circular alternatives to peat in growing media: A microbiome perspective," Journal of Cleaner Production, 2021, pp. 1-16, vol. 327, Article 129375, Elsevier Ltd.
Tien, T.M., et al., Plant Growth Substances Produced by Azospirillum brasilense and Their Effect on the Growth of Pearl Millet (*Pennisetum americanum* L.), Applied and Environmental Microbiology, May 1979, pp. 1016-1024, vol. 37, No. 5, American Society for Microbiology, US.
"Towards Sustainable Growing Media," Chairman's Report and Roadmap, Sustainable Growing Media Task Force, Dr Alan Knight OBE, Chairman, Jun. 2012, 29 pages, UK, URL: https://assets.publishing.service.gov.uk/media/5a7c9843e5274a7b7e3217eb/pb13867-towards-sustainable-growing-media.pdf.

(Continued)

*Primary Examiner* — Audrea B Coniglio
(74) *Attorney, Agent, or Firm* — BARNES & THORNBURG LLP

(57) ABSTRACT

The present disclosure relates to horticultural hydrogels for growing plants and/or fungi, and more particularly to hydrogel-based substrates for the germination, growth, and/or sporulation of those plants and/or fungi.

10 Claims, 4 Drawing Sheets

(56) References Cited

OTHER PUBLICATIONS

"How to Import Foreign Soil and How to Move Soil Within the United States," Circular Q-330.300-1 Soil (Jan. 2010) Revised, 10 pages, U.S. Department of Agriculture, Riverdale, MD, US.
International Search Report (Form PCT/ISA/210), issued Dec. 18, 2023 in corresponding PCT/US2023/073259, ISA/KR, Korean Intellectual Property Office, Daejeon, Republic of Korea, 4 pages.
Written Opinion (Form PCT/ISA/237), issued Dec. 18, 2023 in corresponding PCT/US2023/073259, ISA/KR, Korean Intellectual Property Office, Daejeon, Republic of Korea, 6 pages.

HORTICULTURAL HYDROGELS

CROSS-REFERENCE TO RELATED APPLICATIONS

The present application claims priority to and is a continuation of PCT/US2023/073259 filed Sep. 1, 2023, which claims priority to U.S. Provisional Application No. 63/374,255, filed Sep. 1, 2022, the contents of which are each incorporated herein.

FIELD

The present disclosure relates to horticultural hydrogels for growing plants and/or fungi, and more particularly to hydrogel-based substrates for the germination, growth, and/or sporulation of those plants and/or fungi.

BACKGROUND

Traditional agricultural methods are labor and land intensive and dependent on local climate and weather conditions. Various indoor farming technologies have been developed to address these issues and to produce higher yields in controlled environments.

Unfortunately, current indoor farming systems come with their own limitations. For example, existing aeroponic systems are labor intensive and are not easily automated. In addition, the dense growing environments created by some indoor farming systems can create a stagnant micro-climate under the plant canopy that is susceptible to mold and mildew. Technologies to support aeroponic systems can also be complex, expensive, and difficult to maintain and clean.

Common plant growth substrates have marked disadvantages. Soil is known to contain numerous animal and plant pests and undesirable microbes. USDA Circular Q-330.300-1. Even sterilized soil may have harmful residues from such pathogens, and heat-tolerate microbes or spores that can infect the plant as it grows. The common growth substrate peat has been regulated due to sustainability issues. Towards Sustainable Growing Media (available at: https://assets.publishing.service.gov.uk/media/5a7c9843e5274a7b7e3217eb/pb13867-towards-sustainable-growing-media.pdf). Other alternatives such a coco-peat, fly-ash, tea waste, paper pulp, pine bark, green waste compost, spent mushroom substrate, and recycled rockwool have been tested, but not fully developed for commercial use. Taparia et al. Circular alternatives to peat in growing media; A microbiome Perspective, J. Cleaner Prod., 327 (2021) 12975, Issn 0959-6526. Hydrogels provide multiple advantages as they are sustainable and breakdown into organic components. However, their ability to remain resilient during the plant's lifecycle and provide benefits such as lower germination time and increased biomass remain elusive.

Carrageenans are a class of sulfated polysaccharides extracted from seaweed. They are widely used in the food industry for their thickening and stabilizing properties. They are large and highly flexible molecules that form curling helical structures. While carrageenan is found in some horticultural hydrogels (see US 2020/0344960, US 2014/0100111, JP 6435279, and US 2022/0154030), carrageenan is a small component and used as a thickener rather than the main polymer supporting the gel. The prior art has used additional gelling agents to increase structural stability, teaching away from the use of carrageenan as the main component of a horticultural hydrogel (see, e.g., US 2020/0344960).

Prior horticultural plugs require shape-stabilizing components for efficient function (US 2020/0344960, US 2018/0116137) and maintaining structural integrity. Some publications have employed brackets (US 2018/0116137), while others have used organic substrates to maintain the integrity of the hydrogel, as well as provide for porosity needed by growing roots and plant parts (US 2020/0344960).

While hydrogels and super absorbent polymers (SAPs) have been used for parts of plant propagation, such as seed coatings (US 2014/0100111), root dips (U.S. Pat. No. 7,607,259), and the like, hydrogels have not been heretofore optimized for characteristics for use in automated indoor growing environments in which the hydrogels remain sufficient for nutrition and intact from germination to harvest.

It should be appreciated that there is a need for a scalable, automated indoor farming system having component parts that are easily maintained and cleaned. The improved indoor farming system should provide a healthier and more efficient growing environment, and generate a higher crop yield at a lower energy cost. The present disclosure fulfills these needs and provides further related advantages.

The surprising discovery of the present disclosure is a hydrogel that is resilient, resistant to pathogenic microbes, and capable of sustaining a plant from plant to harvest.

BRIEF SUMMARY OF THE DISCLOSURE

The present disclosure relates to horticultural hydrogels and their process of manufacture that retain large amounts of water, resist breakdown on dehydration, decrease time to germination, increase plant biomass, and are antimicrobial. The hydrogels may be easily made and employed from germination to harvest. They are resilient enough to be compatible with automated indoor growing systems that may employ robotics for plant transplantation and growth.

The plants cultivable and propagable according to the disclosure can be any plants which can grow on a horticultural hydrogel. In particularly preferred embodiments, the products and methods according to the disclosure are suitable for the cultivation of herbs, vegetables, greens, grasses, succulents, berries, ornamental plants, herbaceous perennials and/or woody plants. Examples of vegetables, including all kinds of leafy greens, include green lettuce, red lettuce, romaine lettuce, iceberg lettuce, butter lettuce, chop suey greens, endive, golden purslane, mina, mizuna, komatsuna, pakchoi, spinach, swiss chard, ruby chard, red mustard, watercress, redskin dwarf sweet pepper, radicchio, baby peppers, bok choy, Chinese broccoli, Chinese celery, curry leaves, lemon grass, pea shoots, sesame leaves, choy sum, tatsoi, frilly mustard, baby spinach, bloomsdale spinach, dakon sprout, salad savoy, frisee, green oakleaf, baby leek, garlic chives, marjoram, purslane sorrel, tarragon, broccoleaf, collard greens, dandelion greens, honey gem lettuce, kohlrabi, mesclun, miner's lettuce, mustard greens, arrowhead spinach, puntarelle, epazote, red watercress, Russian kale, scarlet butter lettuce, tat soi, upland cress, living watercress, broccolini, kale, read oak leaf, red salanova, sprouting broccoli, Chinese broccoli, broccoli rabe, green broccoli, Chinese spinach, mibuna, minutina, hops, cannabis, sweet pepper, ramsons, sprouting onion seeds, 'little gem' lettuce, 'marvel of four seasons' lettuce, 'green frills' mustard, gai choy mustard, land seaweed, Greek cress, summer savory, oriental radish (daikon), Chinese lettuce (Celtuce), fenugreek, Chinese cabbage (yow choy), napa cabbage, rainbow Swiss chard, specialty hot peppers, and Easter white eggplant.

Examples of herbs include rocket (rucola), sorrel, coriander, basil (common), basil (Thai), basil (lemon), Cayenne pepper, garlic chives, wild thyme, thyme (lemon), oregano, rosemary, thyme, chives, sage, cilantro, leaf radish, marjoram, lemon balm, Mache, chervil, dill, marjoram, sorrel, tarragon, ice plant, rhubarb, parsley, collard, celery, fennel, mache, tango, chervil, Italian parsley, rapini, Chinese parsley, green purslane, arugala 'Giove', basil (purple ruffles), lemon balm, lemon basil, and purple basil. Examples of halophytes include samphire (glasswort), sea aster (spinach), *Salsola soda*, sea beet, rock samphire, sea kale, New Zealand spinach, saltbush, and alexanders (*Smyrnium olusatrum*). Examples of medicinal plants include peppermint, lavender, anisi fructus, *Echinacea purpureae*, ephedra, holy basil, sage, stevia, *Valeriana officinalis, ginseng, Peruvian ginseng* (Maca), daffodil, *crambe, camellia*, Russian dandelion, St. John's wort, blue cohosh, roman coriander, holy ghost, masterwort, female *ginseng*, stinging nettle, yerba mansa, bloodroot, and drumstick trec. In embodiments, the plants or plant species intended to be cultivated (and hence intended to grow or growing) in the plant cultivation system may be plants growing under the same or similar conditions, such as rucola and basil.

Preferred ornamental plants encompass, for example, *Phalaenopsis* (orchids), *Anthurium* and *Spathiphyllum*. Preferred herbaceous perennials encompass, for example, *Echinacea, Helleborus* and *Heuchera*. Preferred woody plants encompass, for example, *Lycium, Paulownia* and *Vaccinium*.

Examples of berries that could be grown on the horticultural hydrogels of the present disclosure are, but not limited to: strawberry, blackberry, raspberry, and blueberry. Berries show a wide range of freeze hardiness that allows specific cultivars to be grown in a wide variety of climates. As an example, the following blackberry cultivars are commonly grown in the United States: Cultivar Most cold hardy Kiowa Wisconsin, Michigan, Illinois, Arkansas, Missouri Arapaho Illinois, Nebraska, Ohio, Kentucky, Arkansas Shawnee Illinois, Ohio, Kentucky, Tennessee, Virginia Navaho Virginia, Maryland, Delaware, North Carolina Chickasaw N-S Carolina, Delaware, Maryland, Arkansas Least cold hardy Apache Georgia, North Florida, Mississippi, Alabama, and all can be grown on the present disclosure hydrogels. While berries are generally cultivated by cuttings and propagated in shallow flats with loamy soil, the hydrogels of the present disclosure are a clear advantage in that they protect the delicate root systems and are easily transferrable.

Further examples of vegetables that may be cultivated and propagated on the hydrogels of the present disclosure are, but are not limited to: apples, corn, sunflowers, cotton, soybeans, canola, wheat, rice, sorghum, barley, oats, potatoes, oranges, alfalfa, lettuce, strawberries, tomatoes, peppers, crucifers, pears, tobacco, almonds, sugar beets, beans and other valuable crops.

In some embodiments the hydrogels of the disclosure may be used to grow woody plants. Woody plants may include fruit trees, which may be any plant as long as the fruit is edible. The fruit tree may be an herbaceous plant or a woody plant, but a woody plant is preferred. Examples of woody plants include *Pinus* plants, *Prunus* plants (*Prunus* spp., *Prunus mume, Prunus tomentosa, Prunus salicina*, etc.), Avocado genus (Avocado) plants, Mangofera plants (such as *Mangifera indica*), *Prunus* (*Myrica*) plants, Grapes (*Vitis*) plants, Apples (Malus) plants, Roses (Rosa) plants, Crocodiles (*Persea*) plants (such as Avocado (*Persea americana*)), *Pyrus* plants (*Pyrus serotina* Rehder, *Pyrus pyrifolia*), *P. communis*, etc.) Peach (Amygdalus) plants (such as sugar beet), Biwa (*Eriobotrya*) plants (such as *Eriobotrya japonica*), *Diospyros* plants (such as oysters)) *Castanea* plants (such as chestnuts), Matinavi (*Actinidia*) plants (such as Kiwifruit (*Actinidia deliciosa*)), *Ananas* plants (such as *Ananas comosus*), *Citrus* plants (*Citrus unshiu*), Natsumi (*Citrus natsudaidai*), Hassaku (*Citrus hassaku*), Feeling (*Citrus* Iyo), grapefruit (*Citrus* X *paradisi*), etc.), and the like, preferably a fruit belonging to these. Examples of fruit trees include mango, avocado, bayberry, grapes, apples, roses, ume, *japonica*, pears (Japanese pears, pears), cherry, loquat, oysters, chestnuts, kiwifruit, plums, pineapples, citrus and pear plants are preferred, and Japanese pears are more preferred.

It is evident that the use of the products and methods according to the disclosure is not limited to these plants.

In some embodiments the hydrogels of the present disclosure provide plant seeds, such as spinach, a higher germination rate than those germinated in coir. In other embodiments the hydrogels of the present disclosure provide seeds a higher germination than those germinated in peat. In other embodiments the hydrogels of the present disclosure provide seeds a higher germination than those germinated in soil.

In some preferred embodiments, the hydrogels of the present disclosure produce plants that have 40% or more biomass than those grown in soil, peat, or coir. In other embodiments the hydrogels of the present disclosure produce plants with 10%, 20%, 50%, 60%, 70%, 80%, 90%, 100%, 150%, 200%, 250%, 300%, 350%, or 400% more biomass than those grown in soil, peat or coir.

In some preferred embodiments, the horticultural hydrogels may be used to grow fungi. These embodiments include, but are not limited to the following: *Lentula edodes* (shiitake), *Agaricus* spp. (white button), *Antrodia* spp. (Niu Zang), *Plerotus* spp. (oyster), *Auricularia* spp. (wood car), *Volvariella volvacea* (straw mushroom), *Flammulina velutipes* (enokitake), *Grifola frondosa* (maitake), *Ganoderm lucidum, Tremella fuciformis* (white jelly or fungus ear), *Volvariella volvacea* (straw), *Ganoderma lucidem* (reishi), *Hericium erinaceus*, and *Hypsizygus marmoreus* (bunashimeji).

In some embodiments the hydrogels of the present disclosure provide a substrate that produces more fruiting bodies of fungi than that of traditional fungal growth substrate (e.g., solid substrate fermentation).

In other embodiments, the horticultural hydrogels are sufficient for the cultivation of protoplasts or callus tissue. Protoplasts and callus tissue being used for genetic or epigenetic manipulation, in some embodiments.

The hydrogel can be made from a polysaccharide polymer, such as one or more selected from alginate and derivatives thereof, carrageenan, chitins, chitosan and derivatives thereof, cellulose and derivatives thereof, starch and derivatives thereof, cyclodextrin, dextran and derivatives thereof, gums, lignins, pectins, saponins, deoxyribonucleic acids, and ribonucleic acids. The hydrogel can be made from a polymer that is a polypeptide or protein selected from albumin, bovine serum albumin, casein, collagen, fibrinogen, gelatin and derivatives thereof, gliadin, sodium glycine carbonate, bacterial cell membrane enzymes, and poly (amino acids). As for a poly(amino acid), it is preferably selected from polyproline, poly(L-arginine), poly(L-lysine), polysarcosine, poly(L-hydroxyproline), poly(glutamic acid), poly(S-carboxymethyl-L-cysteine), and poly(aspartic acid). Synthetic polymers can also be employed to make the hydrogel, such as when the polymer is a homo- or co-polymer comprised of a monomer selected from acrolein potassium, (meth)acrylamides, (meth)acrylic acid and salts thereof, (meth)acrylates, acrylonitrile, ethylene, ethylene glycol, ethyleneimine, ethyleneoxide, styrene sulfonate, vinyl acetate, vinyl alcohol, vinyl chloride, and vinylpyrrolidone.

Preferred hydrogel polymers are naturally occurring polysaccharides, including the natural polymers of alginic acid, carrageenan, chitosan, and carboxymethylcellulose (and its derivatives), positively and negatively charged polyelectrolytes (PEL), synthetic polymers, such as polyacrylonitrile (PAN) and poly(vinyl alcohol) (PVOH), film-forming polymer emulsions, e.g., homo/multi-polymers of vinyl acetate and various (meth)acrylate derivatives (e.g., methyl, ethyl, butyl), natural or synthetic rubber emulsions and dispersions, natural or chemically modified proteins, polyphenolic compounds, such as tannin-based complexing agents and derivatives thereof, and the like, and mixtures thereof. Also, grafted derivatives of these using a synthetic monomer, such as AAc, acrylonitrile, AAm, and the like, and mixtures thereof, afford hydrogel components in some embodiments of the disclosure.

Particularly preferred hydrogel polymers are selected from polyacrylonitrile, alginic acid (sodium salt, various molecular weights), chitosan (various degrees of deacetylation and molecular weights), carrageenan (kappa), sodium salt of carboxymethylcellulose, pectin, natural and semi-natural gums, such as starch, xanthan, gellan, carrageenan, gum arabic, guar gum, ghatti gum, tragacanth gum, pontianac gum, karaya gum, agar-agar, methyl cellulose, and hydroxypropyl methylcellulose, natural and modified proteins, such as gelatin, collagen, albumin, bovine serum albumin, fibrinogen, casein, gliatin and the like, polyphenolic materials, such as tannin, tannic acid, galotannins, catechin, chlorogenic acid, arbutin, and the like, poly(diallydimethyl ammonium chloride), gelatin with tannic acid as complex-forming agent, polyethyleneimine (PEI), and PVOH before being crosslinked by any chemical or physical methods. In terms of the ethylenically-unsaturated monomer, it is preferably selected from acrylamide (AAm), N-isopropyl acrylamide (NIPAM), 2-hydroxyethyl (meth) acrylate (HEA, HEMA), acrylic acid (AAc), salts of acrylic acid (potassium, sodium and ammonium), potassium salt of 3-sulfopropyl acrylate (SPAK), poly(ethylene glycol) acrylate, poly(ethylene glycol)alkyl ether acrylate, methacrylic acid-2-dimethylaminoethyl ester, dimethylaminoethyl acrylate and diallyldimethylammonium chloride (DADMAC). A still more particularly preferred hydrogel component of the disclosure is selected from the group consisting of sodium carboxymethylcellulose, sodium starch glycolate, sodium carboxymethyl starch, dextran, dextran sulfate, chitosan, carrageenan, xanthan, gellan, hyaluronic acid, sodium alginate, pectinic acid, deoxyribonucleic acids, ribonucleic acid, gelatin, albumin, polyacrolein potassium, sodium glycine carbonate, poly(acrylic acid) and its salts, polyacrylonitrile, polyacrylamide, poly(styrene sulfonate), poly(aspartic acid), polylysine, polyvinylpyrrolidone, polyvinyl alcohol, CARBOPOL, ultramylopectin, poly(ethylene glycol), neutral cellulose derivatives, microcrystalline cellulose, powdered cellulose, cellulose fibers, carbon fibers (including nanotubes), dissolvable suture materials, and starch. Polyamides including vinyl caprolactam, polyethylene glycol, and polylactic acid, polyesters including polyglycolic acid, and dialdehydes may comprise or be additives to the horticultural hydrogel.

More preferably, the hydrogel comprises primarily carrageenan in the absence of a second polysaccharide or polymer. Additionally, in preferred embodiments the hydrogel comprises kappa-carrageenan. In some embodiments, the purity of the carrageenan is between 55-100%. In some preferred embodiments the purity of the carrageenan is between 90-100%. In other embodiments, the hydrogel comprises iota-carrageenan. Purity may be measured by the growth of bacteria in the carrageenan over time, or "bioburden."

In some most preferred embodiments, the hydrogel comprises carrageenan and carbon. The carrageenan and carbon have the surprising properties of being antimicrobial, thus eliminating the need for additive antimicrobial components.

In some embodiments the hydrogel further comprises microcrystalline cellulose. Microcrystalline cellulose increases suspension stability, increases shelf life, increases plant growth, and decreases biodegradation while in use in the greenhouse.

In other embodiments organic material may be used to make the horticultural hydrogels. In these embodiments measurements for springiness, hardness, and cohesiveness decrease, characterizing a "wet gel."

The horticultural hydrogel of the present disclosure may be strengthened through post-crosslinking which may be accomplished chemically, physically or by any other method, including irradiation. Preferred post-crosslinking chemical agents include any multifunctional crosslinkers (e.g., containing hydroxyl, carboxyl, amine, epoxy, amide, urethane groups, and the like), divalent/multivalent metallic cations (e.g., calcium, magnesium, zinc, copper, barium, iron, aluminium, chromium, cerium), phosphates (e.g., pentasodium tripolyphosphate (TPP)), chromates (e.g., dipotassium dichromate), borates (e.g., sodium tetraborate decahydrate), peroxides (e.g., t-butyl hydroperoxide), glycidyl (meth)acrylate, ethylene glycol diglycidyl ether, glutaraldehyde, glycerin, glycols, polyamidoamine epichlorohydrin resin, TMPTA, and the like, and mixtures thereof. Representative crosslinking methods include thermogelation, ionotropic gelation, cryogelation, radiation-induced gelation, chemical gelation, coagulation, crystallization, vulcanization, curing, and combinations thereof. More preferred post-crosslinking methods employ ionotropic gelation (e.g., using anhydrous calcium chloride, cupric sulfate, ammonium cerium (IV) nitrate, ferric chloride hexahydrate, sodium tetraborate decahydrate, zinc chloride, aluminum chloride hexahydrate, chromium chloride, and anhydrous TPP) and cryogelation (e.g., by applying freeze-thaw cycles to PVOH solutions and using another cryogelable materials).

As mentioned above, the growth medium comprises further additives, such as, for example, nutrients. The growth medium can, for example, contain nutrients such as, for example, macronutrients and micronutrients; vitamins, phytohormones, further gelling agents, sugar and/or others. All the additives promote or support the growth of the various plant species. This can occur in different ways. For instance, the additives can directly support plant growth, for example by providing building blocks for the formation of cells and the like, or they can only indirectly support plant growth, for example by preventing or curbing the growth of competing organisms, such as bacteria. The additives are each selected and combined depending on the plant species to be cultivated.

In some embodiments, additives which prevent or curb the growth of competing organisms, such as bacteria, fungi and the like, are generally not needed in the horticultural hydrogel of the present disclosure. It was found that the addition of carbon to the carrageenan gel prohibits unintended bacterial or fungal growth. The addition of relevant additives is therefore not absolutely necessary according to the disclosure.

Suitable nutrients that may be added to the hydrogels of the present disclosure encompass macronutrients, such as nitrogen (N), phosphorus (P), potassium (K), calcium (Ca), magnesium (Mg) and sulfur(S), the macronutrients preferably being present in the growth medium in the form of chemical compounds which contain the respective macronutrient and make it available for the plants. The growth medium comprises, for example, macronutrients in the form of $KNO_3$, $NH_4NO_3$, $MgSO_4 \times 7$ $H_2O$, $KH_2PO_4$ and/or $CaCl_2))\times 2H_2O$. The hydrogels may contain, in some preferred embodiments, Calcium Nitrate (HAIFA CALGG). The concentration is from 100 to 2000 ppm.

Furthermore, suitable nutrients that may be added in some embodiments of the disclosure encompass micronutrients, such as boron (B), iron (Fe), iodine (I), cobalt (Co), copper (Cu), manganese (Mn), molybdenum (Mo), sodium (Na) and zinc (Zn), the micronutrients preferably being present in the growth medium in the form of chemical compounds which contain the respective macronutrient and make it available for the plants. The growth medium comprises, for example, macronutrients in the form of $MnSO_4 \times H_2O$, $ZnSO_4 \times 7$ $H_2O$, $H_3BO_3$, $Na_2MoO_4 \times 2$ $H_2O$, $CuSO_4 \times 5$ $H_2O$, KJ and $CoCl_2 \times 6$ $H_2O$ and NaFe EDTA. The concentration in the growth medium is from 0.01 to 50 ppm. Micronutrients may be commercially available, in some embodiments, such as FLORAPRO by General Hydroponics. In other embodiments, Haifa may be employed as a nutrient.

Suitable vitamins and vitamin-like substances that may be components of the hydrogels of the present disclosure are, for example, thiamine, nicotinic acid, pyridoxine, glycine and myo-inositol. The concentration in the growth medium is from 0.01 to 200 ppm.

Phytohormones control certain growth processes in plants, and so their admixture and concentration are selected depending on the plant species and the purpose of growth (root formation, shoot formation, branching, extension, etc.). Thus, phytohormones may comprise some embodiments of the hydrogels of the present disclosure. Those skilled in the art are capable of making an appropriate selection of phytohormones, and of the other additives defined herein, and of choosing suitable concentrations in each case. The hydrogel can, for example, comprise phytohormones from the following groups of active ingredients: abscisic acid, auxins, cytokinins, gibberellins. The phytohormone(s) is/are present in the growth medium as, for example, indole-3-acetic acid (IAA), 4-(indo-3-yl) butyric acid (IBA), 1-naphthylacetic acid (NAA), 6-benzylaminopurine (BAP), kinetin (KIN), zeatin (ZEA) or 2-isopentenyladenine (2iP). The concentrations in the growth medium are from 0.001 to 50 ppm.

In other embodiments of the present disclosure, fungi may be added to the hydrogel to confer benefit to a plant growing therein. These embodiments include, but are not limited to: *Dominikia, Rhizobium, Azorhizobium, Prunus maackii, Glomus iranicum, Mycorrhiza, Glomus intraradices, G. mosseae, G. aggregatum, G. etunicatum, Glomus deserticola, G. monosporum, G. clarum, Paraglomus brasilianum, Gigaspora margarita, Rhizopogon villosulus, R. luteolus, R. amylopogon, R. fulvigleba, Pisolithus tinctorius, Suillus granulatus, Laccaria bicolor, L. laccata, Scleroderma cepa, S. itrinum, Trichoderma harzianum Rifai,* and *T. virens.*

In some embodiments plant growth promoting bacteria (PGPB) may be added to the hydrogel to enhance growth of the plants therein. Some examples of PGPBs that may be added, without limitation are: *Beauveria bassiana, Bacillus amyloliquefaciens,* and *Streptomyces lydicus.*

What can likewise be used for stabilization is gelatin, preferably a gelatin foam. Especially preferred embodiments use gelatin portions which have a smaller size than a plant plug defined herein and to pour the growth medium according to the disclosure over said portions. Methods for producing suitable gelatin portions, for example gelatin cubes, are known to those skilled in the art. Furthermore, gelatin portions are commercially available. It is envisaged to preferably use gelatin portions which contain colloidal silver or colloidal copper, which thereby confer further sterilizing properties. Appropriate gelatin cubes are, for example, available as "Gelatamp" (Roeko; Coltene, gelatin sponge containing 5% colloidal silver, y-sterile) and "Gelita-Spon®" (Gelita medical; for example cube, 10×10×10, 50, GS-310, Art. 00715118, without silver additive, foamed gel).

Organic material may also be added to the hydrogels of the present disclosure in some embodiments. Organic materials such as peat, coir, silica, wood, shell, sterilized hair or fur, wool, silk, bone, antler fragments, feather, or similar materials may be added to the hydrogels to impart cavities for root growth and nutrition.

The plant plugs according to the disclosure are suitable both for the manual cultivation of plants and for automated or semiautomated and machine cultivation of plants. Preferably, the plant plugs are for the automated or semiautomated cultivation of plants. In this connection and within the meaning of DIN V 19233, "automated" means that the cultivation is carried out by an apparatus which is equipped such that the apparatus works as intended (i.e., achieves a step forward in the cultivation of plants) without any participation at all by a person or with some participation by a person. In other words, the apparatus works autonomously. In the case of the automated or semiautomated cultivation of plants, a plant shoot or plant clone in particular is applied to a plant plug in an automated manner; the plant unit formed from plant part and plant plug is transferred into another device, another device part and/or a container; and/or the plant unit is transferred into a larger plant plug or a soil substrate, it being possible for the larger plant plug to be a plant plug according to the disclosure or a different type of plant plug.

In preferred embodiments of the disclosure, the hydrogels are formed to be plant plugs that are suitable for automated transfer and for cultivation of the plant from seed to harvest. Surprisingly, the hydrogels of the present disclosure maintain their integrity throughout the growth of the seed to plant harvest and do not require re-planting. Moreover, the hydrogels of the present disclosure retain water at a higher rate than previously disclosed hydrogels, coir, and peat.

The size of the plant plug, according to some embodiments of the disclosure, is matched with the plant to be grown, the germination time, the time from germination to harvest, or the size of the harvestable plant grown therein. In addition, it is also possible to produce relatively large plant plugs, for example those which contain recesses for smaller plant plugs and can be used in a "plug-in-plug" system. The plant plug can therefore have, for example, a size of 0.125 $cm^3$ or greater, preferably 1 $cm^3$ or greater. In other words, the plant plug preferably has a volume of from 0.125 $cm^3$ to 27 $cm^3$, more preferably from 10 $cm^3$ to 18 $cm^3$. In a most preferred embodiment the hydrogel plug is 14 $cm^3$. Since the plant plugs according to the disclosure are particularly suitable for automated high-throughput cultivation, the plant plugs can be particularly small in some embodiments.

Therefore, in some embodiments, the plant plug has a volume of 27 cm$^3$ or lower, preferably 16 cm$^3$ or lower, or 10 cm$^3$ or lower.

The hydrogels of the present disclosure can be made to form a plurality of commercially known trays. For instance, the hydrogels may be formed in any of the horticultural products listed at T.O. Plastics (toplastics.com/horticulture?hsLang=en). This includes, but is not limited to: plug trays, square plant pots, standard inserts, standard flats, true & slim flats, true & slim inserts, regional inserts & flats, propagation trays, sheet pots, round plant pots, or plant pic containers. In other embodiments, the container may be a basket so support the hydrogel in a deep water culture or in a nutrient film technique. In other embodiments, the horticultural hydrogel may be supported in a basket in deep water culture or nutrient film.

At the same time, the plant plug can have the shape of a cuboid, for example the shape of a cuboid having substantially equal sides. However, the plant plug according to the disclosure is not limited to this shape. For example, it is likewise conceivable to form plant plugs having a cylindrical, hexagonal, polygonal, or hemispheric shape.

Moreover, the horticultural hydrogels of the present disclosure may be poured into a sheet suitable for the growth of plants such as microgreens. In some embodiments the hydrogels of the present disclosure may reside in large pots, creating a "Dutch bucket system." In these embodiments, approximately 18927 cm$^3$ of liquid hydrogel is poured into a 5 gallon container to harden.

Furthermore, the horticultural hydrogel may be formed into the shape of pellets, varying in size and diameter from about 0.25-6 inches. The pellets, as in some embodiments may be mixed with other traditional plant growing substrates such as soil, peat or coir.

In some embodiments the horticultural hydrogels may be freeze-dried. In these embodiments, the freeze-drying offers several advantages. Namely, the freeze-dried horticultural hydrogels are lighter in weight, owing to their near absence of water content, and can be easily and economically transported for use. Additionally, through freeze-drying, the horticultural hydrogels may become more porous, offering additional volume for root architecture and growth. These embodiments create a "loose fill" that may be advantageous for the cultivation of woody plants.

In other embodiments the horticultural hydrogels may be frozen and thawed to create "loose fill". In yet other embodiments the horticultural hydrogels may be partially dehydrated by freeze-thaw. Freezing the horticultural hydrogels, either by freeze-dry or traditional freezing methods (below 32° C.), allow for the removal of water, making the hydrogels easier to distribute as they are of a lighter weight.

In some embodiments, the materials comprising the horticultural hydrogels may be organic. In other embodiments, the horticultural hydrogels may support fungal growth. In yet other embodiments, wherein iota-carrageenan is used, the horticultural hydrogels may be liquid.

In some embodiments, the hydrogel plug at the upper surface has a dibble. A dibble is an indention suitable to receive a seed, plurality of seeds, spore, plurality of spores, or mycelium. The dibble may be created in the hydrogel through the use of an auger or dibbler. The size of the dibble is dependent on the use (e.g., smaller dibble for smaller seeds).

Moreover, wherein the hydrogel is a sheet, the sheet may be abraded for germination of seeds.

In some embodiments of the disclosure a hydrogel comprising water, carrageenan, microcrystalline cellulose, carbon, and an acid to adjust pH has a hardness of between 150-1000 g/cm$^2$, a cohesiveness of between 70-90%, and a springiness of 95-100%. More preferably, the hydrogels have a hardness of between 350-800 g/cm$^2$, a cohesiveness of 75-85%, and a springiness of 95%. In some embodiments the hydrogels have an electroconductivity measurement of between 3.5-8.5 mS/cm. In other preferred embodiments of the present disclosure the horticultural hydrogels have an electroconductivity measurement of between 4.0-8.0 mS/cm.

In other embodiments the hydrogel comprises water, K-carrageenan, carbon, calcium nitrate, micronutrients, and microcrystalline cellulose, and, optionally, an acid to adjust pH, they hydrogel having a hardness of more than 150 g/cm$^2$, a springiness of over 95.0%, a cohesiveness of over 75.0%, a pH between 6-8, and an EC measurement of between 4-8 mS/cm.

In yet other embodiments, the hydrogel comprises water, carrageenan, carbon, calcium nitrate, micronutrients, microcrystalline cellulose and peat and/or coir, and an optional acid to adjust pH to between 6-8.

In yet more embodiments the hydrogel comprises water, carrageenan, calcium nitrate, micronutrients, and microcrystalline cellulose with an optional acid to adjust the pH to between 6-8. In these embodiments the hydrogel is clear in nature, and wherein a plant germinates therein, the roots can be seen growing through the hydrogel.

Wherein an acid is used to adjust the pH of the horticultural hydrogel, the following non-limiting list of acids and bases may be used: citric acid, phosphoric acid, or potassium hydroxide.

In most embodiments of the disclosure the hydrogel comprises 98% water or more. Surprisingly, the hydrogels of the present disclosure retain water content for up to 90 days. In other embodiments, the hydrogels of the present disclosure retain water content for up to 21 days, 14 days, 30 days, 45 days, 60 days, 75 days, 90 days, 120 days, 150 days, 180 days, or 210 days. Even more surprisingly, the hydrogels can lose water such that the hydrogel comprises 60% or less and be rehydrated to 98% without losing efficacy (e.g., increased biomass and decreased time to germination). Thus, the hydrogels of the present disclosure have an increased resiliency of water retention and rehydration relative to that known in the art.

In some embodiments the hydrogels of the present disclosure may be dehydrated to 60% water through freezing and thawing. In other embodiments the hydrogel is liquid in formulation.

Wherein the hydrogels are used for the cultivation of fungi, added nutrients, micronutrients or substrates may be employed.

The hydrogel may be formulated in any mixture herein described.

Surprisingly, the horticultural hydrogel of the present disclosure is able to maintain springiness and hardness such that the hydrogel may be manipulated by mechanical machinery while providing a growing substrate with decreased germination time and increased biomass at harvest.

These and other objects and features of the disclosure will become more fully apparent from the following detailed description of the disclosure and the claims.

BRIEF DESCRIPTION OF THE FIGURES

The disclosure will be better understood, and features, aspects, and advantages other than those set forth above will become apparent when consideration is given to the following detailed description thereof. Such detailed description refers to the following drawings.

DETAILED DESCRIPTION

Definitions

Figure 1:
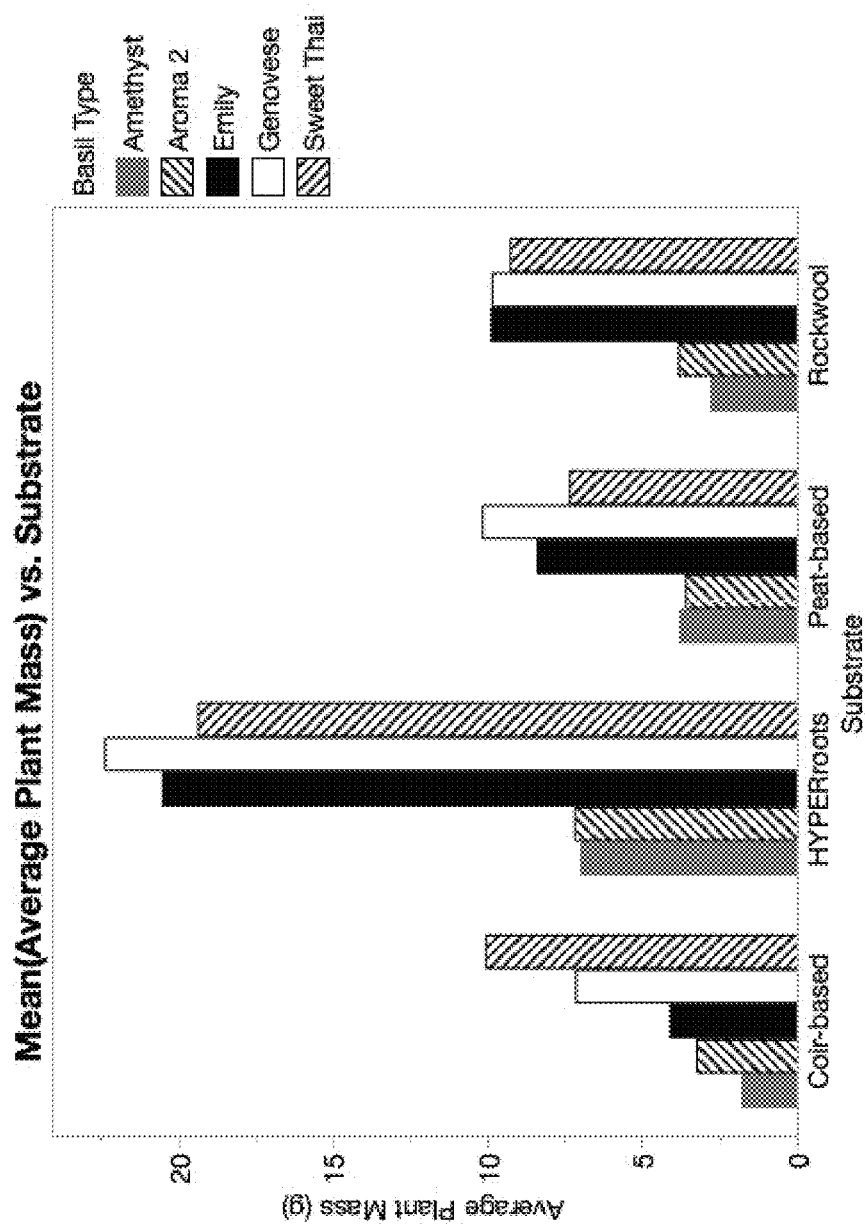
FIG. 1 is a graph of separate types of basil grown in the horticultural hydrogels of the disclosure.

Unless otherwise defined, all terms of art, notations and other scientific terms or terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

The singular form "a", "an", and "the" include plural references unless the context clearly dictates otherwise. For example, the term "a cell" includes one or more cells, including mixtures thereof.

"Ambient temperature" as used herein is a temperature of between 18° C. to 24° C. and a relative humidity of between 60% to 95%.

As used herein, "biofertilizers" are microbial fertilizers that supply the plant with nutrients and thereby can promote plant growth in the absence of chemical fertilizers. Non-limiting examples of microbial isolates that can directly promote plant growth and/yield include N2-fixing bacteria *Rhizobium* and *Bradyrhizobium* species that, through symbiotic nitrogen fixation, can form nodules on roots of leguminous plants, in which they convert atmospheric N2 into ammonia which, in contrast to atmospheric N2, can be used by the plant as a nitrogen source. Other examples include *Azospirillum* species, which are free-living N2-fixers that can fertilize and increase yield of cereal crops such as wheat, sorghum, and maize. Despite *Azospirillum*'s N2-fixing capacity, the yield increase caused by inoculation by *Azospirillum* is often attributed to increased root development and thus to increased rates of water and mineral uptake. In this respect, several rhizobacteria like *Azotobacter* spp. have been reported to be capable of producing a wide array of phytohormones (e.g., auxins, cytokinins) and enzymes (e.g., pectinase). Many of these phytohormones and enzymes have been shown to be intimately involved in the infection process of symbiotic bacteria-plant associations which have a regulatory influence on nodulation by *Rhizobium*. Biofertilizers can also affect the plant growth and development by modifying nutrient uptake. They may alter nutrient uptake rates, for example, by direct effects on roots, by effects on the environment which in turn modify root behavior, and by competing directly for nutrients (Gaskins et al., Agricult. Ecosyst. Environ. 12:99-116, 1985). Some factors by which Biofertilizers may play a role in modifying the nutrient use efficiency in soils include, for example, root geometry, nutrient solubility, nutrient availability by producing plant congenial ion form, partitioning of the nutrients in plant and utilization efficiency. For example, a low level of soluble phosphate can limit the growth of plants. Some plant growth-promoting microbes are capable of solubilizing phosphate from either organic or inorganic bound phosphates, thereby facilitating plant growth. Several enzymes of microbial origin, such as nonspecific phosphatases, phytases, phosphonatases, and C-P lyases, release soluble phosphorus from organic compounds in soil. For example, an increased solubilization of inorganic phosphorus in soil has been found to enhance phosphorus uptake in canola seedling using *Pseudomonas putida* as well as increased sulfur-oxidation and sulfur uptake (Grayston and Germida, Can. J. Microbiol. 37:521-529, 1991; Banerjee, Phytochemicals and Health, vol. 15, May 18, 1995).

"Biostimulants", as used herein, can produce substances that stimulate the growth of plants in the absence of pathogens. For example, the production of plant hormones is a characteristic of many plant-associated microorganisms. Some microorganisms can also produce secondary metabolites that affect phytohormone production in plants. Probably, the best-known example is hormone auxin, which can promote root growth. Other examples include pseudomonads which have been reported to produce indole acetic acid (IAA) and to enhance the amounts of IAA in plants, thus having a profound impact on plant biomass production (Brown, Annual Rev. Phytopathology, 68:181-197, 1974). For example, Tien et al. (Applied Environmental Microbiol., 37:1016-1024, 1979) reported that inoculation of nutrient solutions around roots of pearl millet with *Azospirillum brasiliense* resulted in increased shoot and root weight, an increased number of lateral roots, and all lateral roots were densely covered with root hairs. Plants supplied with combinations of IAA, gibberellins and kinetin showed an increase in the production of lateral roots similar to that caused by *Azospirilla*. Additionally, some rhizobacteria, such as strains of the bacterial species *B. subtilis*, *B. amyloliquefaciens*, and *Enterobacter cloacae*, promote plant growth by releasing volatile organic compounds, VOCs. The highest level of growth promotion has been observed with 2,3-butanediol and 3-hydroxy-2-butanone (also referred to as acetoin) as elicitors of induced systemic resistance. The cofactor PQQ has been described as a plant growth promoter, which acts as an antioxidant in plants. Other examples of biostimulants, as contemplated by the present disclosure, include products listed at https: growerssecret-.com. Particularly, Grower's Secret Professional, Seaweed Powder 0-0-16, Soluble Corn Steep Powder 7-6-4, Granule's 8-3-1, Nitrogen 16-0-0, Liquid Nitrogen 8-0-0, Grower's Secret Microbes, Phosphorous 0-9-0, Seaweed Powder 0-0-16, or VitalVit Micronutrients. Other biostimulants include silica, amino acids, or agriculturally relevant enzymes.

"Carbon" as used in the present disclosure includes charcoal. Carbon may be commercially sourced such as through General Carbon, Fisher Scientific and VWR.

"Carrageenan" is an anionic polymer, a sulfated linear polysaccharide. Carrageenans have been classified into three different types, namely, κ-carrageenan, τ-carrageenan, and λ-carrageenan on the basis of the degree of sulfation. Carrageenan, as is contemplated in the present disclosure, refers to kappa carrageenan, which as the highest hydro-gel forming efficiency. The source may be purchased commercially such as Ricogel, Marcel, W-Hydrocolloids or CP Kelco. Carrageenan can also be purified from red algae as is known by those skilled in the art.

"Fertilizer" as used in the present disclosure provides nutrients such as phosphorus, nitrogen, carbon, hydrogen, oxygen, potassium, calcium, magnesium, sulfur, iron, boron, copper, manganese, zinc, molybdenum, chlorine, cobalt, or nickel whether synthetic or organic. Suitable fertilizers may be commercially sourced, such as Miracle-Gro water soluble plant food vegetable and herbs, Clonex, Dyna-Gro, M&S (Murashige and Skoog) or FloraMicro. As used herein "fertilizer", which generally are classified according to their NPK content. NPK is common terminology used in the fertilizer industry and stands for: (1)N—the amount of nitrogen in the formulation as N; (2) P—the amount of phosphorus in the formulation as $P_2O_5$; and (3) K—the amount of potassium in the formulation as $K_2O$. In other words, the N refers to nitrogen-containing compounds that are added to the soil and are utilized by the particular plant to satisfy its nitrogen requirement. The P refers to phosphorus-containing compounds that are added to the soil and are utilized by the particular plant to satisfy its phosphorus requirement (a nutrient required for plant growth). K refers to potassium-containing compounds that are added to the soil and are utilized by the particular plant to satisfy its potassium requirement (another nutrient essential for plant growth). Besides these nutrients, namely nitrogen, phosphorus and potassium, which are normally provided by the addition of fertilizers that typically are known as NPK fertilizers, other nutrients can also be provided by the addition of fertilizers to the soil. Typical nutrients are calcium, magnesium, sulfur, iron, zinc, manganese, copper, boron, and molybdenum. The term "fertilizer" as used herein, unless expressly indicated otherwise, refers to NPK fertilizers, that is, fertilizers that include one or more of the nutrients (nitrogen, phosphorus and potassium).

"Cohesiveness" defines the cohesive properties of a polymer find direct expression in its solubility in organic liquids. The cohesive properties of a substance are expressed quantitatively in the cohesive energy. This quantity is closely related to the internal pressure, a parameter appearing in the equation of state of the substance.

"Hardness" is the resistance of a material to permanent indentation or maximum force of the gel. Hardness can be measured in $g/cm^2$.

A "hydrogel" is a crosslinked hydrophilic polymer that does not dissolve in water. They are highly absorbent yet maintain well defined structures.

"Organic" means components that have been certified as organic from the USDA National Organic Program.

"Organic materials" means carbon-based materials such as soil, wood or wood components (e.g., shavings), peat, coir, and other natural materials.

"Plant" or "plant part" includes all parts of the plant, including: root, stem, meristem, seed, leaf, cotyledons, and the like.

"Plant plugs" (commonly referred to as in vitro plugs) as used herein are generally relatively small shaped bodies composed of a growth medium that serve for the cultivation and propagation of plants in a very early developmental stage. Plant plugs generally have a consistency which allows a manual or machine transfer of the plugs into other cultivation vessels or transport or processing units. Owing to their small size and transferability, plant plugs can be suitable for medium- and high-throughput methods in plant cultivation and can also be used for the space-saving transport of plants in an early developmental stage.

"Polysaccharide" as used herein, means a carbohydrate (e.g. starch, cellulose, or glycogen) whose molecules consist of a number of sugar molecules bonded together. Polysaccharides include gellan.

As used herein "soil" means either man-made or naturally occurring unconsolidated mineral or organic material on the immediate surface of the Earth that serves as a natural medium for the growth of land plants. Soil used for indoor growing is generally sterilized and devoid of added living biologic material.

"Springiness" is s the rate at which a deformed material goes back to its undeformed condition after deforming force is removed. It is a measurement of elastic recovery and has a unit of percent (%).

"Water" includes purified, distilled and reverse osmosis (RO) water, which may be charged as in some preferred embodiments of the present disclosure.

All publications and patent applications mentioned in this specification are herein incorporated by reference to the same extent as if each individual publication or patent application was specifically and individually indicated to be incorporated by reference.

No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art.

The discussion of the general methods given herein is intended for illustrative purposes only. Other alternative methods and embodiments will be apparent to those of skill in the art upon review of this disclosure As shown in FIG. 1, various varieties of basil were grown in the horticultural hydrogels of the disclosure (named herein as HYPERROOTS), as well as other substrates including Rockwool, JIFFY, and ihort. The formulation for HYPERROOTS is outlined below in Example 7. The basil varieties grown were Amethyst, Aroma 2, Emily, Genoves, and Sweet Thai. Each basil variety had an increased plant mass in grams when grown in the horticultural hydrogel relative to that variety grown in each of the three other substrates. Data and watering regime are outlined in Table 2, below.

Figure 2:
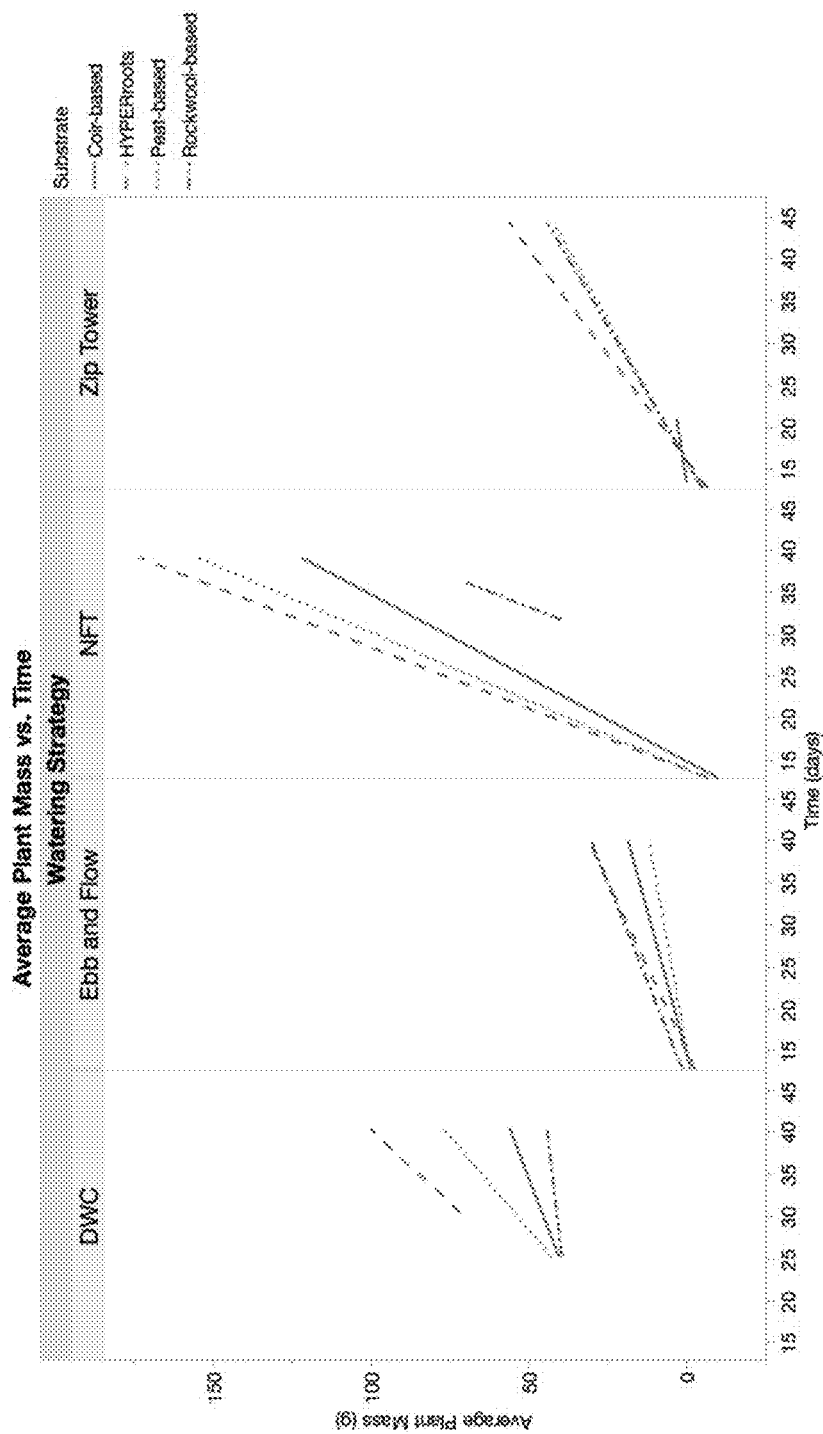
FIG. 2 is a growth chart of various media and types of lettuces grown in an indoor environment including the horticultural hydrogels of the disclosure, as in some embodiments.

As shown in FIG. 2, varieties of lettuce were grown in various watering conditions and in various substrates. In each case the hydrogel formulation was kappa-carrageenan, microcrystalline cellulose, water, carbon, and nutrients. The formulation for HYPERROOTS is outlined below in Example 5. The hydrogels had an EC of 0.9-1.3 mS/cm and a pH between 5.7-6.1. The following watering conditions were used: DWC is Deep Water Culture where rafts are left floating on top of hydrogel beds with the hydrogel being in contact with water, Ebb and Flow means the plants were watered for 5 minutes in every 2 hour cycle, Misting means that they were misted overhead and watered two times per day, NIFT means Nutrient Film Technique with continuous watering, and Zip Towers received continuous watering. As demonstrated, lettuce grown in both HYPERROOTS and HYPERROOTS LF demonstrated a higher average plant mass than that grown under other substrates with various watering or environmental regimines. Further measurements and data are found in Table 1, below.

Figure 3:
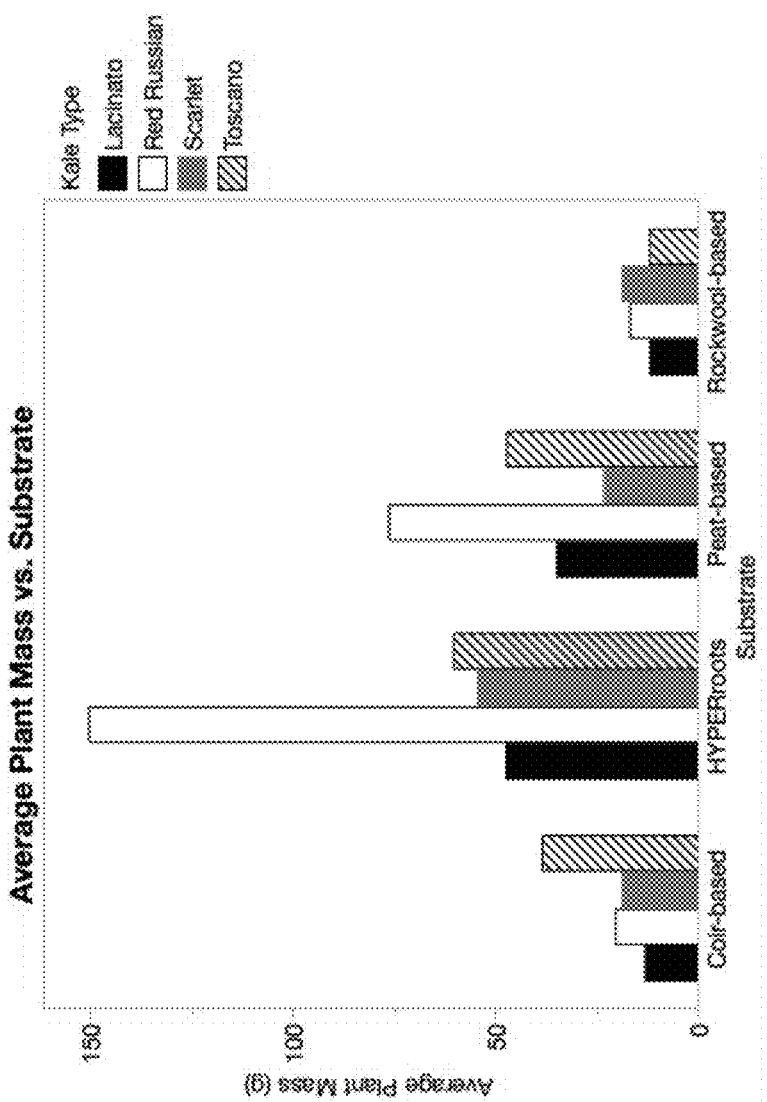
FIG. 3 is a growth chart of various media and types of kale grown in an indoor environment including the horticultural hydrogels of the disclosure, as in some embodiments.

FIG. 3 shows average plant mass of varieties of kale grown on various substrates, including the horticultural hydrogel (HYPERROOTS). Kale varieties Lacinato, Red Russian, Scarlet, and Toscano were grown in HYPER-ROOTS, ihort, Jiffy, or Rockwool. As demonstrated, each kale variety had increased biomass when grown on the horticultural hydrogel relative to when grown on the other substrates. The horticultural hydrogel (HYPERROOTS) formulations are exemplified below in Example 7 and the data collected are seen in Table 3.

Figure 4:
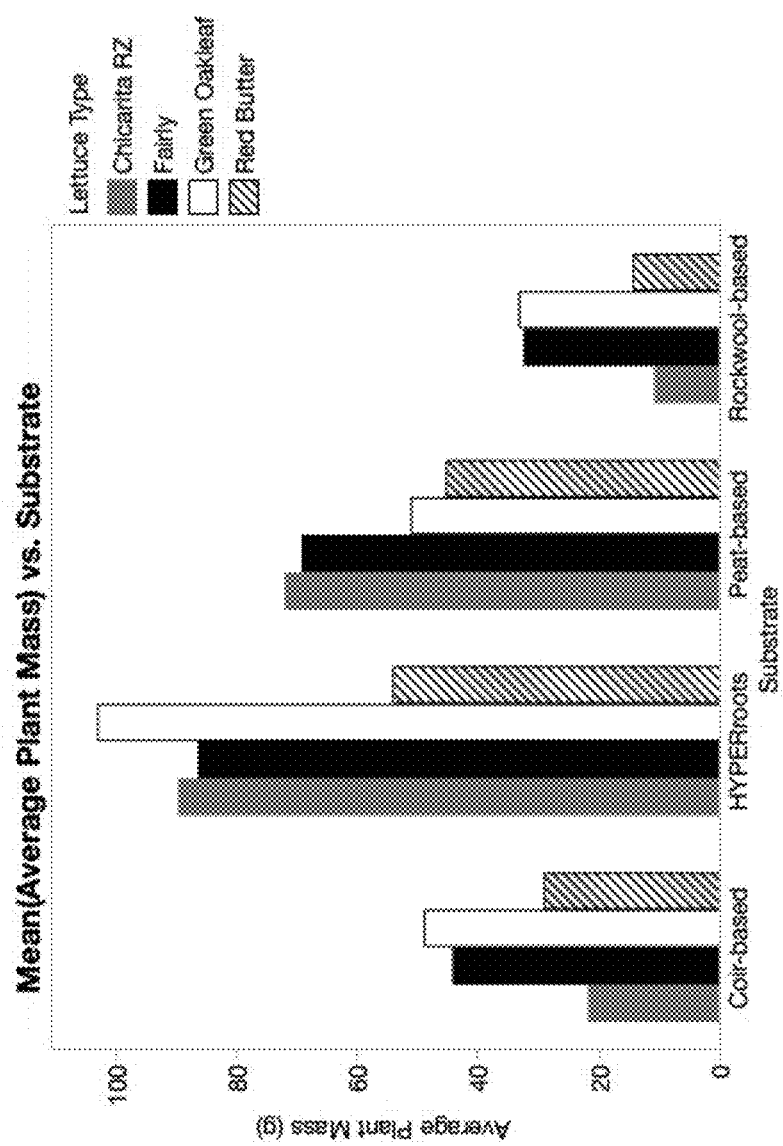
FIG. 4 is a plant mass chart for various varieties of lettuces on various substrates and the horticultural hydrogels of the disclosure.

FIG. 4 shows average plant mass of varieties of lettuce grown on various substrates, including the horticultural hydrogel (HYPERROOTS). Lettuce varieties Chicarita RZ, Fairly, Green Oakleaf, and Red Butter were grown in HYPERROOTS, coir-based, peat-based, or Rockwool-based. As demonstrated, each lettuce variety had increased biomass when grown on the horticultural hydrogel relative to when grown on the other substrates. The horticultural hydrogel (HYPERROOTS) formulations are exemplified below in Example 7. Data including the varieties and substrates depicted in FIG. 4 can be found in Table 3

TABLE 1 varieties of lettuce grown on the horticultural hydrogels and other substrates using various watering.

| | | | | | Average Wet Weight and Standard Deviation (g) | | | | | | | | | |
|---|---|---|---|---|---|---|---|---|---|---|---|---|---|---|
| Version | Lot | Species | Days | Watering | HYPERroots | | Rockwool | | Peat | | Coir | | Ihort | |
| 2.0 | HYP-1768 | Fairly Lettuce | 14 | E&F | 1.05 | 4.67 | 0.56 | 2.67 | 0.62 | 2.47 | 0.55 | 1.82 | | |
| | | | 39 | | 22 | 17 | 18 | 6 | 13 | 7 | 11 | 3 | | |
| 2.0 | HYP-1769 | Five Star Lettuce | 14 | E&F | 0.25 | 0.1 | | | 0.2 | 0.8 | 0.21 | 0.79 | | |
| | | | 25 | | 1.3 | | | | 0.73 | | 0.8 | | | |
| 2.0 | HYP-1770 | Crunchy Lettuce | 14 | NFT | 58.4 | 89.74 | | | 34.9 | 73.05 | 35.01 | 65.5 | | |
| | | | 38 | | 192 | 32 | | | 178 | 45 | 132 | 61 | | |
| 2.0 | HYP-1773 | Fairly Lettuce | 14 | Misted | 0.81 | 0.23 | 0.1 | 0.04 | 0.3 | 0.09 | 0.32 | 0.11 | | |
| 2.0 | HYP-1777 | Aroma 2 (basil) | 14 | Zip Towers | 0.18 | 0.55 | 0.06 | 0.15 | 0.07 | 0.1 | 0.06 | 0.15 | | |
| | | | 32 | | 2.74 | | 0.72 | | 0.49 | | 0.71 | | | |
| 2.0 | HYP-1778 | Mizuna | 14 | Zip Towers | 0.44 | 0.55 | 0.15 | 0.49 | 0.18 | 0.41 | 0.19 | 0.48 | | |
| | | | 21 | | 2.77 | 2.41 | 2.73 | 1.31 | 2.97 | 1.44 | 3.02 | 0.98 | | |
| 2.0 | HYP-1787 | Fairly Lettuce | 13 | NFT | 135.6 | 20.3 | 40.9 | 8.2 | 123 | 22.6 | 64 | 19.1 | | |
| 2.0 | HYP-1788 | Fairly Lettuce | 13 | DWC | 92.6 | 23.9 | 30.2 | 9.5 | 79 | 29.4 | 53.5 | 15.7 | | |
| 2.0 | HYP-1789 | Fairly Lettuce | 13 | DWC | 90.6 | 24 | 25.7 | 7.3 | 69 | 16.8 | 40.5 | 7.9 | | |
| 2.1 | HYP-1806 | Fairly Lettuce | 43 | Zip Towers | 55 | 17.97 | 43 | 15.5 | | | | | 41 | 16.87 |
| | | | 38 | DWC | 68.4 | 29.9 | 48.8 | 22.2 | | | | | 62.5 | 31.5 |
| | | | 36 | NFT | 112.1 | 27.06 | 68.2 | 24.5 | | | | | 91.4 | 27.64 |
| 2.1 | HYP-1809 | Fairly Lettuce | 36 | DWC | 100.5 | 21.88 | 60.4 | 24.7 | | | | | 77.8 | 25.22 |
| | | | 36 | | 100.8 | 23.41 | 52.7 | 21.4 | | | | | 82 | 23.76 |

Note,
the first column indicates the lot of HYPERroots used. Plants grown on other substrates (e.g., Rockwool, Peat, Coir, or Ihort) did not include any horticultural hydrogel in the substrate.

TABLE 2 varieties of basil were grown on various substrates for 20 days, and their biomass was then taken.

| | | | | | Average Wet Weight and Standard Deviation (g) | | | | | | | |
|---|---|---|---|---|---|---|---|---|---|---|---|---|
| Version | Lot | Species | Days | Watering | HYPERroots | | Rockwool | | Jiffy | | Ihort | |
| 2.2 | HCT-12 | Basil-Aroma 2 | 28 | NFT | 18.6 | 1.64 | 10.6 | 5.95 | 8.8 | 7.94 | 10.1 | 3.09 |
| 2.2 | HCT-13 | Basil-Amethyst | 35 | NFT | 7 | 1.06 | 2.8 | 0.35 | 1.8 | 1.8 | 3.8 | 0.95 |
| 2.2 | HCT-14 | Basil-Emily | 35 | NFT | 20.5 | 2.88 | 9.9 | 1.56 | 4.1 | 4.85 | 8.4 | 2.6 |
| 2.2 | HCT-15 | Basil-Sweet Thai | 35 | NFT | 19.3 | 6.88 | 9.2 | 1.29 | 10 | 7.93 | 7.3 | 1.67 |
| 2.2 | HCT-16 | Basil-Genovese | 35 | NFT | 22.3 | 5.39 | 9.8 | 3.32 | 7.1 | 10.7 | 10.1 | 2.2 |

Table 3 is data from lettuces and kales with DWC watering on various substrates.

| | | | | | Average Wet Weight and Standard Deviation (g) | | | | | | | |
|---|---|---|---|---|---|---|---|---|---|---|---|---|
| Version | Lot | Species | Days | Watering | HYPERroots | | Rockwool | | Jiffy | | Ihort | |
| 2.2 | HCT-8 | Green Oakleaf | 40 | DWC | 102.71 | 25.1 | 32.92 | 10.5 | 48.64 | 14 | 50.77 | 8.6 |
| 2.2 | HCT-9 | Fairly Lettuce | 34 | DWC | 90.63 | 22.59 | 47 | 14.4 | 51.67 | 5.16 | 62.14 | 9.06 |
| 2.2 | HCT-10 | Red Butter | 34 | DWC | 53.75 | 20.83 | 14 | 8.25 | 28.75 | 11.57 | 45 | 8.66 |
| 2.2 | HCT-11 | Chicarita RZ | 34 | DWC | 89.57 | 24.3 | 10.71 | 13.05 | 21.67 | 14.43 | 71.92 | 16.68 |
| 2.2 | HCT-17 | Red Russian Kale | 34 | DWC | 150 | 48.18 | 16.36 | 8.39 | 20 | 30.55 | 75.63 | 18.41 |
| 2.2 | HCT-18 | Lacinato Kale | 35 | DWC | 47.5 | 29.64 | 11.88 | 0.04 | 13.13 | 12.23 | 35 | 32.18 |
| 2.2 | HCT-19 | Scarlet Kale | 35 | DWC | 54.38 | 28.84 | 18.75 | 5.18 | 18.75 | 6.41 | 23.33 | 8.66 |
| 2.2 | HCT-20 | Toscano Kale | 35 | DWC | 60 | 17.73 | 11.67 | 7.53 | 38.13 | 17.1 | 46.88 | 13.35 |
| 2.2 | HCT-21 | Leaf Broccoli | 35 | DWC | 99.38 | 34.99 | 12.5 | 9.64 | 19.29 | 12.05 | 41.67 | 18.87 |

Table 4 shows data from a variety of basils and sweet pepper as outlined in Example

| | | | | | Average Wet Weight and Standard Deviation (g) | | | | | | | |
|---|---|---|---|---|---|---|---|---|---|---|---|---|
| Version | Lot | Species | Days | Watering | HYPERroots | | Rockwool | | Soil | | Ihort | |
| 2.1 | HYP-1824 | King Arthur Bell Pepper | 92 | E&F | 768 | 92.97 | na | na | 574 | 73.8 | na | na |
| 2.2 | HCT-105 | Genovese Basil | 21 | Hand | 0.33 | 0.16 | 0.17 | 0.06 | 0.05 | 0.04 | 0.19 | 0.06 |
| 2.2 | HCT-106 | Sweet Thai Basil | 21 | Hand | 0.2 | 0.08 | 0.18 | 0.05 | 0.27 | 0.09 | 0.14 | 0.05 |
| 2.2 | HCT-107 | Lemon Basil | 21 | Hand | 0.61 | 0.29 | 0.33 | 0.1 | 0.48 | 0.15 | 0.28 | 0.08 |
| 2.2 | HCT-108 | Cinnamon Basil | 21 | Hand | 0.38 | 0.22 | 0.28 | 0.09 | 0.07 | 0.08 | 0.27 | 0.09 |

Table 5 shows data from various leafy plants with watering conditions and varying substrates.

| | | | | | Average Wet Weight and Standard Deviation (g) | | | | | | | | | |
|---|---|---|---|---|---|---|---|---|---|---|---|---|---|---|
| Version | Lot | Species | Days | Watering | HYPERroots | | HYPERroots LF | | Rockwool | | Jiffy | | Ihort | |
| 2.2 | HCT-90 | Cedar | 31 | DWC | 108 | 14 | na | na | 100 | 15 | 112 | 17 | 90 | 16 |
| 2.2 | HCT-90 | Dunand | 31 | DWC | 36 | 16 | na | na | 31 | 13 | 31 | 13 | 32 | 8 |
| 2.2 | HCT-90 | Skyphos | 31 | DWC | 50 | 6 | na | na | 64 | 14 | 66 | 9 | 57 | 9 |
| 2.2 | HCT-90 | Bughatti | 31 | DWC | 69 | 10 | na | na | 55 | 12 | 73 | 10 | 58 | 11 |
| 2.2 | HCT-87 | Monte Carlo Romaine | 26 | DWC | na | na | 28.8 | 8.2 | 30.6 | 5.2 | 22.4 | 5.3 | 28.4 | 6.5 |
| 2.2 | HCT-89 | Rainbow Chard | 26 | DWC | na | na | 22 | 6.5 | 14.8 | 5.7 | 18.1 | 9.6 | 32.4 | 13.2 |
| 2.2 | HCT-82-2 | Five Star Lettuce | 27 | DWC | na | na | 26 | 4.7 | 23 | 6.5 | 15.9 | 3.4 | 29.6 | 6.5 |

Composition of the Disclosure

Examples

Example 1: Horticultural Hydrogels

Horticultural Hydrogels Supporting Increased Biomass

The following components were used to make a plurality of horticultural hydrogels:

| | RO Water | RICO 8800 | Carbon Black | Fertilizer (Salt) |
|---|---|---|---|---|
| 1687-1 | 1970 g | 23 g | 2 g | 4 g M&S |
| 1687-2 | 1970 g | 23 g | 2 g | 4 g Miracle-Gro Water soluble Plant Food Vegetable & Herbs |
| 1687-3 | 1970 g | 23 g | 2 g | 4 g Haifa Ca(NO$_3$)$_2$ + 1 mL/L FloraMicro |
| 1687-4 | 1970 g | 23 g | 2 g | 4 g Yara Ca(NO$_3$)$_2$ + 1 mL/L FloraMicro |

-continued

|  | RO Water | RICO 8800 | Carbon Black | Fertilizer (Salt) |
|---|---|---|---|---|
| 1687-5 | 1970 g | 23 g | 2 g | 7 mL/L Clonex |
| 1687-6 | 1970 g | 23 g | 2 g | 1.3 mL/L Dyna-Gro |

RO water was stirred at 500 rpm and solid ingredients were added. Liquid ingredients were then added. The mixture was heated to 85° C. and cooled to 60° C. before being poured into gel plug molds. The resulting hydrogels were tested for cohesiveness, hardness, and springiness.

|  | Cohesiveness (%) | Hardness (g/cm2) | Springiness (%) | pH | EC (mS/cm) |
|---|---|---|---|---|---|
| 1687-1 | 77.1 | 477.83 | 100 | 7.0 | 3.28 |
| 1687-2 | 84.52 | 221.24 | 100 | 7.8 | 4.88 |
| 1687-3 | 63.31 | 876.25 | 100 | 8.5 | 4.85 |
| 1687-4 | 62.99 | 883.48 | 100 | 8.7 | 4.57 |
| 1687-5 | 83.67 | 325.40 | 100 | 8.5 | 3.62 |
| 1687-6 | 85.83 | 231.09 | 100 | 8.1 | 3.56 |

Lettuce seeds were planted after the hydrogel had become solid and harvested at day 14. The total plant mass was then taken. Controls were plants grown in peat and coir under the same conditions.

|  | Average Mass (g) | Total Plant Mass (g) |
|---|---|---|
| 1687-1 | 1.035245906 | 24.4381 |
| 1687-2 | 1.161994568 | 26.1991 |
| 1687-3 | 1.43010119 | 39.86597 |
| 1687-4 | 1.581263823 | 40.4764 |
| 1687-5 | 1.450607318 | 36.8462 |
| 1687-6 | 1.455981413 | 35.258 |

Example 2: Varying Carrageenan, Carbon, Fertilizer in the Hydrogel

JMP software was used to design a set of experiments to improve the formulation of Ricogel 81137 for plant growth, as 81137 has been shown to work more effectively than competitors in growing some leafy greens. JMP recommended 15 experiments that were run to optimize the 5 ingredients: water, carrageenan, carbon, calcium citrate, and M&S.

These are the amounts in grams required for ingredients in the 15 batches of gel, assuming that the total mass of each will be 2000 g:

| Water (g) | Ricogel (g) | Carbon (g) | M&S (g) | Calcium Citrate (g) | Batch Code |
|---|---|---|---|---|---|
| 1962 | 20 | 2 | 8 | 8 | HYP-1679-1 |
| 1960 | 34 | 2 | 4 | 0 | HYP-1679-2 |
| 1960 | 20 | 8 | 4 | 8 | HYP-1679-3 |
| 1964 | 20 | 8 | 8 | 0 | HYP-1679-4 |
| 1962 | 20 | 2 | 8 | 8 | HYP-1679-5 |
| 1974 | 20 | 2 | 4 | 0 | HYP-1679-6 |
| 1960 | 22 | 2 | 8 | 8 | HYP-1679-7 |
| 1960 | 20 | 8 | 4 | 8 | HYP-1679-8 |
| 1960 | 24 | 8 | 8 | 0 | HYP-1679-9 |
| 1960 | 34 | 2 | 4 | 0 | HYP-1679-10 |
| 1974 | 20 | 2 | 4 | 0 | HYP-1679-11 |
| 1974 | 20 | 2 | 4 | 0 | HYP-1679-12 |
| 1960 | 20 | 8 | 4 | 8 | HYP-1679-13 |
| 1964 | 20 | 8 | 8 | 0 | HYP-1679-14 |
| 1960 | 34 | 2 | 4 | 0 | HYP-1679-15 |
| 1979 | 18 | 1 | 2 | 0 | HYP-1679-16 |
| 1979 | 18 | 1 | 2 | 0 | HYP-1679-17 |
| 1979 | 18 | 1 | 2 | 0 | HYP-1679-18 |
| 1971 | 24 | 3 | 2 | 0 | HYP-1679-21 |

Each batch was made by the following process: charge water, initiate stirring, charge solid ingredients. Water and solid ingredients were mixed and heated to 85° C. then cooled to less than 70° C. and poured into gel plug molds. The Ricogel used was a uniform sample of 10 lots of 81137.

Samples were tested for cohesiveness (%), hardness (g), springiness (%). pH and EC (mS/cm).

The Results are Below:

| Name | Cohesiveness (%) | Hardness(g) | Springiness (%) |
|---|---|---|---|
| HYP-1661 | 73.38 | 755.29 | 100 |
| HYP-1679-1 | 69.39 | 524.44 | 100 |
| HYP-1679-2 | 76.79 | 897.54 | 100 |
| HYP-1679-3 | 70.07 | 415.9 | 100 |
| HYP-1679-4 | 68.81 | 507.11 | 100 |
| HYP-1679-5 | 67.2 | 570.31 | 100 |
| HYP-1679-6 | 75.86 | 317.74 | 100 |
| HYP-1679-7 | 66.3 | 708.61 | 100 |
| HYP-1679-8 | 71.88 | 485.94 | 100 |
| HYP-1679-9 | 70.18 | 608.93 | 100 |
| HYP-1679-10 | 75.05 | 1138.34 | 100 |
| HYP-1679-11 | 74.39 | 398.4 | 100 |
| HYP-1679-12 | 74.79 | 412.37 | 100 |
| HYP-1679-13 | 69 | 478.8 | 100 |
| HYP-1679-14 | 68.81 | 589.3 | 100 |
| HYP-1679-15 | 76.59 | 783.83 | 100 |
| HYP-1679-16 | 81.5 | 196.75 | 100 |
| HYP-1679-17 | Data not taken, too soft | Data not taken, too soft | Data not taken, too soft |
| HYP-1679-18 | 82.99 | 184.2 | 100 |
| HYP-1679-21 | 80.81 | 348.49 | 100 |

| Name | pH | EC (mS/cm) |
|---|---|---|
| HYP-1661 | 6.8 | 7.34 |
| HYP-1679-1 | 6.4 | 6.15 |
| HYP-1679-2 | 6.1 | 4.71 |
| HYP-1679-3 | 6 | 4.09 |
| HYP-1679-4 | 5.8 | 7.21 |
| HYP-1679-5 | 6.2 | 7.27 |
| HYP-1679-6 | 6.4 | 4.65 |
| HYP-1679-7 | 6.5 | 6.85 |
| HYP-1679-8 | 6.1 | 3.87 |
| HYP-1679-9 | 5.8 | 6.38 |
| HYP-1679-10 | 6.8 | 4.84 |
| HYP-1679-11 | 6.6 | 3.99 |
| HYP-1679-12 | 6.4 | 3.26 |
| HYP-1679-13 | 6.1 | 5.22 |
| HYP-1679-14 | 5.8 | 7.15 |
| HYP-1679-15 | 6.3 | 5.11 |
| HYP-1679-16 | Data not taken | Data not taken |
| HYP-1679-17 | 7.5 | Data not taken |
| HYP-1679-18 | 7.2 | 2.29 |
| HYP-1679-21 | 8.2 | 2.67 |

Samples were observed for dehydration seven (7) days after pouring by visualization and clear shrinkage of the plug where the hydrogel no longer fills the plug receptacle.

| Name | Total Plugs | Total Plugs Dehydrated | Total Edge Plugs | Total Edge Plugs Dehydrated |
|---|---|---|---|---|
| HYP-1661 | 50 | 43 | 26 | 24 |
| HYP-1679-1 | 100 | 52 | 36 | 28 |
| HYP-1679-2 | 100 | 65 | 36 | 33 |
| HYP-1679-3 | 100 | 40 | 36 | 19 |
| HYP-1679-4 | 100 | 24 | 36 | 18 |
| HYP-1679-5 | 100 | 38 | 36 | 16 |
| HYP-1679-6 | 100 | 9 | 36 | 3 |
| HYP-1679-7 | 100 | 63 | 36 | 29 |
| HYP-1679-8 | 100 | 23 | 36 | 15 |
| HYP-1679-9 | 100 | 51 | 36 | 26 |
| HYP-1679-10 | 100 | 78 | 36 | 35 |
| HYP-1679-11 | 100 | 41 | 36 | 20 |
| HYP-1679-12 | 100 | 20 | 36 | 12 |
| HYP-1679-13 | 100 | 20 | 36 | 8 |
| HYP-1679-14 | 100 | 81 | 36 | 33 |
| HYP-1679-15 | 100 | 25 | 36 | 15 |
| HYP-1679-16 | 100 | Missed count | 36 | Missed count |
| HYP-1679-17 | 100 | Missed count | 36 | Missed count |
| HYP-1679-18 | 100 | 42 | 36 | Missed count |
| HYP-1679-21 | 100 | 69 | 36 | Missed count |

Example 3: Germination and Biomass Measurements of the Hydrogel Recipe for 1689

98 L of water was added to a 100 L glass jacketed reactor. The temperature of the jacket was adjusted to 50° C. Ricogel 8800 (1.15 kg) was charged to the reactor. Dialysis was initiated. This was continued for 72 hours. To this mixture was added M&S (200 g) and carbon black (400 g). The mixture was warmed to 85° C. The mixture was cooled to less than 70° C. The mixture was trayed and tested for plant growth. Various seeds were planted. Control groups of seeds planted in coir or peat were also used. When tested hydrogels had a hardness of 360.42, cohesiveness of 80.64, and springiness of 100.

Notably, after fourteen (14) days of plant growth there were no visible signs of dehydration (see below). The hydrogel plugs were easily transferable to a zip tower for further growth.

The following are results of the germination and growth of Butter Lettuce:

| Confluence Code | Graph Titles | Seeds Planted | Germination | Successful | % Germ | % Healthy |
|---|---|---|---|---|---|---|
| HYP-1689 | Tray 1 | 40 | 39 | 38 | 97.50% | 95.00% |
| HYP-1689 | Tray 2 | 40 | 40 | 40 | 100.00% | 100.00% |
| HYP-1689 | Tray 3 | 40 | 40 | 39 | 100.00% | 97.50% |
| Coir | Coir | 40 | 39 | 21 | 97.50% | 52.50% |
| Peat | Peat | 20 | 16 | 16 | 80.00% | 80.00% |

The following table represents results for the growth of Kale

| Confluence Code | Graph Titles | Seeds Planted | Germination | Successful | % Germ | % Healthy |
|---|---|---|---|---|---|---|
| HYP-1689 | Tray 1 | 40 | 34 | 30 | 85.00% | 75.00% |
| HYP-1689 | Tray 2 | 40 | 33 | 32 | 82.50% | 80.00% |
| HYP-1689 | Tray 3 | 40 | 29 | 28 | 72.50% | 70.00% |
| Coir | Coir | 30 | 11 | 9 | 36.67% | 30.00% |
| Peat | Peat | 20 | 17 | 15 | 85.00% | 75.00% |

| | HYP-1689 Tray 1 | HYP-1689 Tray 2 | HYP-1689 Tray 3 | Coir Coir | Peat Peat |
|---|---|---|---|---|---|
| Avg. Wet Weight | 0.5106 | 0.603314286 | 0.673285714 | 0.322018182 | 0.654205882 |
| STDEV | 0.265696544 | 0.284583187 | 0.285486826 | 0.116675917 | 0.308565276 |
| Total Weight | 16.8498 | 21.116 | 18.852 | 3.5422 | 11.1215 |

Example 4: Horticultural Hydrogel Formulations in Spinach with Improved Germination Rates The following ingredients were in all formulations:

| Component | Amount |
|---|---|
| RO Water | 1970 g |
| RICO 8800 | 23 g |
| Activated Carbon | 2 g |

The following formulations also contained:

HYP-1687-1-(4 g) Standard M&S

HYP-1687-2-(4 g) Miracle-Gro-Water soluble Plant Food Vegetable & Herbs HYP-1687-3-(4 g) Haifa Ca(NO$_3$)$_2$+1 mL/L FloraMicro HYP-1687-4-(4 g) Yara brand Ca(NO$_3$)$_2$+1 mL/L Flora-Micro HYP-1687-5-Clonex 7 mL/L HYP-1687-6-Dyna-Gro 1.3 mL/L The following procedure was used for each test. Added charged water into 5000 mL beaker. Initiated stirring at 500 rpm. Added the solid ingredients into a beaker and mixed together. Added solid ingredients to beaker. Added liquid ingredients into beaker, if applicable. Heated to 85° C. Cooled to 60° C. Poured into gel plug molds.

The formulations had the following properties:

| Formulation | Cohesiveness (%) | Hardness (g) | Springiness (%) | pH | EC (mS/cm) |
| --- | --- | --- | --- | --- | --- |
| HYP-1687-1 | 77.91 | 477.83 | 100 | 7.0 | 3.28 |
| HYP-1687-2 | 84.52 | 221.24 | 100 | 7.8 | 4.88 |
| HYP-1687-3 | 63.31 | 876.25 | 100 | 8.5 | 4.85 |
| HYP-1687-4 | 62.99 | 325.40 | 100 | 8.7 | 4.57 |
| HYP-1687-5 | 83.67 | 325.40 | 100 | 8.5 | 3.62 |
| HYP-1687-6 | 85.83 | 231.09 | 100 | 8.1 | 3.56 |

Germination rate exceeded 95% which is above the expected 80% in other substrate media.

Example 5: V 2.0 14 mL Plugs (HYP-1773)

Procedure

Charged water into 100 L glass, jacketed reactor. Initiated stirring at 100 rpm. Added the ingredients into a beaker and added to reactor. Increased agitation to 400 rpm. Waited until the mixture was homogeneous (2-5 minutes). Reduced agitation to 150 rpm. Heated to 85° C. Held at 85° C.+/−3 C for 30 minutes. Cooled to less than 70° C. Poured into 14 mL trays.

| Component | Lot | Amount |
| --- | --- | --- |
| RO Water | | 24550 g |
| Ricogel 8800 | 220515K | 300 g |
| Activation Carbon | GCC-HH3401 | 75 g |
| Haifa Ca(NO$_3$)$_2$ | 435572396 | 62.5 g |
| FloraMicro | | 12.5 g |

| Name | Cohesiveness (%) | Hardness (g) | Springiness (%) | pH | EC (mS/cm) |
| --- | --- | --- | --- | --- | --- |
| HYP-1773 | 85.29 | 254.14 | 100 | 6.94 | 3.65 |

Example 6: V 2.1 100 L (HYP-1802)

Procedure

Charged water into 100 L reactor. Initiated stirring at 400 rpm. Added formulation ingredients. FloraPro was ground up with a mortar and pestle to ensure it was homogeneous. Reduced stirring to 200 rpm. Heated to 85° C. Held for 30 minutes. Cooled to 55° C. and poured into 14 mL gel molds.

| Component | Amount |
| --- | --- |
| RO Water | 98167 g |
| Ricogel8800 | 1200 g |
| Activated Carbon | 300 g |
| Haifa Ca(NO$_3$)$_2$ | 250 g |
| FloraPro | 66 g |

| Name | Cohesiveness (%) | Hardness (g) | Springiness (%) | pH | EC (mS/cm) |
| --- | --- | --- | --- | --- | --- |
| HYP-1803 | 77.36 | 260.69 | 100 | 6.54 | 6.61 |

Example 7: V 2.2 20 Tray Batch (HYP-1871)

Procedure

Changed water heater to 'Very hot' an hour prior to beginning experiment. Charged water into 100 L glass, jacketed reactor. Set temperature to 125° C. Initiated stirring at 200 rpm. Added ingredients to reactor at 70° C. Decreased stirring to 100 RPM after 5-10 minutes. Turned jacket to 75° C. once 83° C. was reached to hold at 83° C.-85° C.+/−3 C for about 30 minutes. Cooled to 65° C. (+/−) 5° C. Poured into 14 mL trays.

| Component | Lot | Amount |
| --- | --- | --- |
| RO Water | | 58900 g |
| Ricogel8800 | 220507E | 720 g |
| Activation Carbon | GCC-HH3401-1 | 180 g |
| Haifa Ca(NO$_3$)$_2$ | 435572396 | 150 g |
| FloraPro | | 39 g |
| Microcrystalline Cellulose | | 18 g |

| Name | Cohesiveness (%) | Hardness (g) | Springiness (%) | pH | EC (mS/cm) |
| --- | --- | --- | --- | --- | --- |
| HYP-1871 | 79.17 | 238.03 | 100 | 6.98 | 5.73 |

Example 8: Horticultural Hydrogel Formulations

V2.2 Manufacturing for 100 L Batch

Ingredients

| Product Name | Chemical Name | Amount |
| --- | --- | --- |
| Ricogel8800 | K-Carrageenan | 1,200 g |
| WDC | Activated Carbon | 300 g |
| Haifa Cal GG | Calcium Nitrate | 250 g |
| FloraPro | Micronutrients | 66 g |
| Microcrystalline Cellulose | | 33 g |
| RO Water | | 96.3 L |

Procedure

Checked valves are closed, and hoses were properly connected on the USALabs 100 L reactor. In a beaker, added solid ingredients and mixed together. Checked that RO water tank light was on, then weighed water amount. Placed hose into RO water bucket and moved it into reactor via peristaltic pump in reverse. Initiated stirring at 400 RPM. Opened nitrogen tank valve and listened to the connected hose to ensure nitrogen was present and flowing. Removed the reactor's stopper with a hose and inserted funnel into the open neck. Added ingredients from beaker slowly via scooping or pouring. Once all ingredients were added, inserted the stopper with hose back into the open neck and glass lid. Closed/turned off nitrogen tank. Stirred at 400 RPM for 2-5 minutes. Powered on Heater/Chiller, selected 'Loop', 'Heat', and 'Cool.' Set Heater/Chiller to 115° C.-135° C. Once mixture appeared homogenous, reduced stirring to 200

RPM. Closed jacket around reactor. At 82° C., adjusted Heater/Chiller to 85° C. Once 85° C. was reached, started timer for 30 minutes. After 30 minutes, decreased Heater/Chiller to 65° C. Once the mixture was 65° C. (+/−) 5°, opened the bottom valve and connected the dispensing hose to the connector. Placed hose nozzle to tray and turned pump on 'forward' at the necessary speed to dispense. Squeegeed trays to smooth plugs. Added metal sheets or individual trays to the cold room for at least 30 minutes.

The horticultural hydrogels of this embodiment have the following specifications, two batches are provided, HYP-1881 and HYP-1891:

| Test | Method | Specification | HYP-1881 | HYP-1891 |
| --- | --- | --- | --- | --- |
| Appearance | Inspection | Black gel | Black gel | Black gel |
| Hardness | 10% compression TA | ≥150 g/cm² | 261.93 | 282.06 |
| Springiness | 10% compression TA | ≥95.0% | 100% | 96.58% |
| Cohesiveness | 10% compression TA | ≥75.0% | 82.91% | 81.66% |
| pH | pH of gel SOP | 6-8 | 6.42 | 6.64 |
| EC | EC of gel SOP | 4-8 mS/cm | 6.59 | 6.54 |

Example 9: HYP-1915 Cold Quench in Field Reactor V2.2 HYPERROOTS

Procedure

Set water heater to 'very hot' for at least 30 minutes. Initiated stirring at 10. Added 134 kg heated, charged water to field reactor. Set temperature of jacket to 105° C. overnight and stirring at 30 rpm. Increased temperature to 165° C. the following morning to increase temperature of water from 74.5° C. up to 83° C.-85° C. Decreased temperature to 88° C. at 83° C. Added ingredients to reactor at 83° C. with stirring at 30 rpm. Increased stirring to 55-60 to remove clumps from behind baffles after about 30 minutes. Weighed 63 kg of room temperature water and dumped it in via water jugs. Cold quench dropped temperature from 83° C. to 65° C. Set jacket to 70° C. and decreased stirring to 30. Poured into: 200 cell×1.75, 288 cell, 1-inch deep trays, 50-cell, 10-200 cell, 6-288 cell, 50-cell, and a deep tray filled to an inch (for a thick mat) saved for Jonathan. Three trays placed in sealed plastic bag with nitrogen to test storing in wrapped condition.

| Component | Amount |
| --- | --- |
| RO Water | 197000 g |
| Ricogel8800 | 2400 g |
| Haifa Ca(NO₃)₂ | 500 g |
| Activation Carbon | 600 g |
| Microcrystalline Cellulose | 60 g |
| FloraPro | 132 g |

| Name | Cohesiveness (%) | Hardness (g) | Springiness (%) | pH | EC (mS/cm) |
| --- | --- | --- | --- | --- | --- |
| HYP-1915 | 85.09 | 249.07 | 97.26 | 6.79 | 6.67 |

Example 10: 50 L Batch of V2.2

Ingredients

| Component | Lot # | Amount |
| --- | --- | --- |
| RO Water | | 49,080 g |
| Ricogel8800 | 220712F | 600 g |
| Activated Carbon | GCC-HH3401-1 | 150 g |
| Haifa | 435572396 | 125 g |
| FloraPro | | 33 g |
| Microcrystalline Cellulose | Fisher - A0443067 | 15 g |

Changed water heater to 'Very hot' 30 minutes to an hour prior to beginning experiment. Then charged water into 100 L glass, jacketed reactor. Set temperature to 125° C., and initiated stirring at 350 rpm. Added ingredients to reactor and decreased stirring to 200 RPM after 5-10 minutes. Turned jacket to 95° C. once 83° C. was reached to hold at 83° C. to 88° C.+/−3 C for about 30 minutes. Decreased temperature to 65° C. and stirring to 100 RPM. Poured into two 288-cell trays and the rest as standard once 65+/−5° C. was reached. Gels had a cohesiveness of 80.26%, hardness of 282.02 g, springiness of 96.03%, pH of 6.81, and electroconductivity of 6.94 mS/cm.

Example 11: 100 L Batch Loose Fill Horticultural Hydrogels

SOP: HYPERROOTS LF V1.0 Manufacturing for 100 L Batch

Ingredients

| Product Name | Chemical Name | Amount | Manufacturer |
| --- | --- | --- | --- |
| Ricogel8800 | K-Carrageenan | 2500 g | W Hydrocolloids |
| WDC | Activated Carbon | 600 g | General Carbon |
| Haifa Cal GG | Calcium Nitrate | 400 g | Haifa Group |
| FloraPro | Micronutrients | 100 g | General Hydroponics |
| Microcrystalline Cellulose | | 20 g | Thermo Scientific |
| RO Water | | 96.4 L | In house |

Procedure

Checked valves are closed, and hoses were properly connected on the USALabs 100 L reactor. In a beaker, added solid ingredients and mixed. Checked that RO water tank light was on, then weighed water amount. Placed the hose into the RO water bucket and moved it into the reactor via the peristaltic pump in reverse. Initiated stirring at 400 RPM. Opened nitrogen tank valve and listened to the connected hose to ensure nitrogen was present and flowing. Removed the reactor's stopper with a hose and inserted funnel into the open neck. Added ingredients from beaker slowly via scooping or pouring. Once all ingredients were added, inserted the stopper with hose back into the open neck in glass lid. Closed/turned off nitrogen tank. Stirred at 400 RPM for 2-5 minutes. Powered on Heater/Chiller, selected 'Loop', 'Heat', and 'Cool'. Set Heater/Chiller to 115°-135° C. Once mixture appeared homogenous, reduced stirring to 200 RPM. If clumps persisted, pulsed 400 RPM stirring multiple times. Closed jacket around reactor. At 82°, adjusted Heater/Chiller to 89°. Once 83° C. is reached, started timer for 30 minutes. After 30 minutes, decreased Heater/Chiller to 65° C. Once the mixture is 65° C. (+/−) 5°, opened the bottom valve and connected the dispensing hose to the connector. Placed hose nozzle to tray and turned pump on 'forward' at the necessary speed to begin dispensing. Squeegeed trays to smooth plugs. Added metal sheets or individual trays to the cold room for at least 30 minutes. Cut plugs into sizes appropriate for the loose-fill application.

Example 12: Increased in Biomass for Plants Grown in the Horticultural Hydrogel-Bell Peppers Plants were allowed to grow naturally with no cultivation methods applied. This was done to see how vigorous the plants were without any other factors added in. Plants propagated in HYPERroots grew larger from the start, getting a week increase in flower formation, then leading to earlier harvest. No negative growth was noticed in plants propagation in HYPERroots. At end of trial plants propagated in HYPERroots produced more fruit and a week quicker than the control in same conditions.

|  | HYPERroots | Soil |
|---|---|---|
| Total Weight of Fruit | 2303.6 | 1720.7 |
| Average Weight of Fruit | 69.80606061 | 63.72962963 |
| Number of Fruits | 33 | 27 |
| Fruits Per Plant | 11 | 9 |
| Weight of Fruit Per Plant | 767.8666667 | 573.5666667 |
| % Extra Total Weight of Fruit | 34% | |
| % Extra Average Weight of Fruit | 10% | |
| % Extra Number of Fruits | 22% | |
| % Extra Fruits Per Plant | 22% | |

Example 13: Hydrogels for Woody Plant Cultivation Ingredients

| Component | Amount |
|---|---|
| RO Water | 97,385 |
| Ricogel8800 (220507E) | 2,000 g |
| Activated Carbon | 300 g |
| Haifa Ca(NO$_3$)$_2$ | 250 g |
| FloraPro | 66 g |

Protocol

100 L batch of 2% gel poured in 288-cell, sheets, and 200-cell trays that are to be frozen, thawed and used to test woody plant growth. Changed water heater to 'Very hot' 30 minutes to an hour prior to beginning experiment. Charged water into 100 L glass, jacketed reactor. Set temperature to 125° C. Initiated stirring at 120 rpm. Added ingredients to reactor at 82° C. Increased stirring to 350 RPM after 10 minutes and had to pivot the baffle to release large clump around impeller. Decreased stirring to 150 RPM. Turned jacket to 87° C. once 85° C. was reached to hold at 83-85° C.+/−3 C for about 30 minutes. Turned stirring down to 100 RPM after heating and holding cycle. Cooled to 65° C. (+/−) 5° C. Poured into 288 cell trays, sheets, and 200-cell to be frozen, thawed and used as loose fill for woody plant growth studies.

The hydrogel pellets of this test had 84.93% cohesiveness, 583.75 g hardness, 100% springiness, pH of 6.71 and 8.07 mS/cm electroconductivity.

Example 14: Hydrogel Formulations for Mushroom Cultivation

| Component | 1875-1 | 1875-2 | 1875-3 | 1875-4 | 1875-5 |
|---|---|---|---|---|---|
| RO water | 2921 g | 2927 g | 2912 g | 2905 g | 2902 g |
| Ricogel 8800 | 60 g | 60 g | 75 g | 75 g | 75 g |
| Microcrystalline Cellulose | 10 g | — | — | 10 g | 10 g |
| Chitosan | — | 3 g | 3 g | — | 3 g |
| Haifa Ca(NO$_3$)$_2$ | 7.5 g | 7.5 g | 7.5 g | 7.5 g | 7.5 g |
| FloraPro | 2 g | 2 g | 2 g | 2 g | 2 g |

Procedure

Charged water into 5 L reactor. Initiated stirring at 400 rpm. Added formulation ingredients. Reduced stirring to 200 rpm. Heated to 85° C. Held for 30 minutes. Cooled to 60° C.+/−5 and poured into 14 mL gel molds to be placed in the cold room. Place in pressure cooker for 30 minutes at 15 psi before inoculation.

Results

| Name | Cohesiveness (%) | Hardness (g) | Springiness (%) | pH | EC (mS/cm) |
|---|---|---|---|---|---|
| HYP-1875-1 | 85.95 | 557.93 | 100 | 7.84 | 7.19 |
| HYP-1875-2 | 86.32 | 535.78 | 100 | 8.18 | 7.65 |
| HYP-1875-3 | 86.74 | 816.28 | 100 | 8.20 | 7.83 |
| HYP-1875-4 | 87.19 | 738.85 | 100 | 8.47 | 7.85 |
| HYP-1875-5 | 85.87 | 846.54 | 100 | 8.44 | 8.29 |

Example 15: Organic Horticultural Hydrogels

The following process was followed: Charged water into 5 L reactor, initiated stirring at 400 rpm, added formulation ingredients, reduced stirring to 200 rpm, heated to 85° C., held for 30 minutes, cooled to 55° C., and poured into 14 mL gel molds.

| Component | HYP-1775-1 | HYP-1775-2 | HYP-1775-7 | HYP-1798-1 (triplicate) | HYP-1798-2 (triplicate) |
|---|---|---|---|---|---|
| RO Water | 2946 g | 2946 g | 2906 g | 2901 g | 2910 g |
| Ricogel8800 | 36 g | 36 g | 45 g | 45 g | 45 g |
| Activated Carbon | 9 g | 9 g | 9 g | 18 g | 18 g |
| Acadian | 9 g | — | 9 g | 6 g | 6 g |
| Root Rocket | — | 9 g | — | — | — |
| Cal-Mag | — | — | 31 g | 30 g | 21 g |

Properties

| Name | Cohesiveness (%) | Hardness (g) | Springiness (%) | pH | EC (mS/cm) |
|---|---|---|---|---|---|
| HYP-1775-1 | 94.31 | 37.87 | 100 | 6.45 | 3.02 |
| HYP-1775-2 | 93.49 | 42.90 | 100 | 7.15 | 3.00 |
| HYP-1775-7 | 84.33 | 340.36 | 100 | 5.75 | 4.21 |
| HYP-1798-1-1 | 89.12 | 200.89 | 100 | 5.21 | 5.60 |
| HYP-1798-1-2 | 90.35 | 190.37 | 100 | 5.20 | 5.56 |
| HYP-1798-1-3 | 89.85 | 191.82 | 100 | 5.20 | 5.93 |
| HYP-1798-2-1 | 91.27 | 144.40 | 100 | 5.31 | 4.93 |
| HYP-1798-2-2 | 91.61 | 156.08 | 100 | 5.30 | 4.96 |
| HYP-1798-2-3 | 92.12 | 135.45 | 100 | 5.32 | 4.76 |

Other suitable organic formulations were made in large batches. The following process was followed.

Example 16: Liquid Formulations of the Horticultural Hydrogel

The following process was followed: ingredients added to a 5 L beaker, initiated stirring at 200 RPM, heated to 85° C., cooled to room temperature at 200 RPM, poured into labeled 1-gallon jug, and stored in refrigerator. The solutions were sprayed onto rock wool instead of a normal fertigation solution.

| Name | RO Water | Ricovis8870 Mass | General Carbon WDC Mass | Haifa Cal GG Mass | FloraPro Calcium + Micros Mass | Microcrystaline Cellulose Mass |
|---|---|---|---|---|---|---|
| HYP-1893-1 | 3987 | 4 | 4 | 20 | .4 | .4 |
| HYP-1893-2 | 3932 | 4 | 20 | 4 | 4 | 4 |
| HYP-1893-3 | 3987 | 4 | 4 | 4 | .4 | 4 |
| HYP-1893-4 | 3987 | 4 | 20 | 20 | 4 | 4 |
| HYP-1893-5 | 3960 | 10.95 | 12 | 10.86 | 2.2 | 2.2 |
| HYP-1893-6 | 3960 | 10.95 | 12 | 10.86 | 2.2 | 2.2 |
| HYP-1893-7 | 3932 | 4 | 4 | 20 | .4 | 4 |
| HYP-1893-8 | 3987 | 4 | 4 | 4 | 4 | .4 |
| HYP-1893-9 | 3987 | 20 | 4 | 4 | 4 | 4 |
| HYP-1893-10 | 3987 | 4 | 20 | 20 | 4 | .4 |
| HYP-1893-11 | 3932 | 4 | 20 | 4 | .4 | .4 |
| HYP-1893-12 | 3932 | 20 | 4 | 4 | 4 | .4 |
| HYP-1893-13 | 3987 | 10 | 4 | 20 | 4 | 4 |
| HYP-1893-14 | 3987 | 20 | 20 | 10 | .4 | .4 |
| HYP-1893-15 | 3932 | 20 | 4 | 10 | .4 | .4 |
| HYP-1893-16 | 3932 | 10 | 20 | 20 | 4 | 4 |

Example 17: Specifications for K-Carrageenan

| Test | Method | Specification |
|---|---|---|
| Appearance | Inspection | Creamy white powder to light tan |
| Mesh Size, <80 mesh | C of A | >95.0% |
| pH | 1.5% aqueous at 60° C. | 7-10 |
| Potassium gel strength | 1.0% gel with 0.2% K | >45 g/cm2 |
| Total Plate Count | ACTA labs method | <50,000 CFU/g |
| Yeast and Molds | ACTA labs method | <100 CFU/g |
| Salmonella | C of A | Absent in 10 g |
| E. coli | C of A | Absent in 5 g |
| Coliform | C of A | <10 CFU/g |
| L. monocytogenes | C of A | Absent in 25 g |
| S. aureus | C of A | Absent in 25 g |
| SEC HPLC | ACTA labs method | Peak at 1 RRT >50.0% |
| Appearance of Solution | ACTA labs method | Clear and colorless |

Compliant Products

| Vendor | Product | Part Number |
|---|---|---|
| W Hydrocolloids | K-carrageenan | Ricogel 8800 |
| W Hydrocolloids | K-carrageenan | Ricogel 81137 |
| W Hydrocolloids | K-carrageenan | Ricogel 88128 |
| Marcel | K-carrageenan | GU-9303 |

Example 18: Taking Hardness Measurements

Measurements were taken using a Stable Micro Systems TA.XT ExpressC Texture Analyzer (TA). The TA was powered on and calibrated with a 2000 g weight for weight and for height. The following measurements were measured: distance (mm), force (g), time (sec) and temperature (° F.). Pre-test speed was set to a compression value of 1.00 mm/sec, Test Speed was set to a compression value of 1.00 mm/sec, Post-test speed was set to a compression value of 2.00 mm/sec. Target mode Strain was set to 25.0% and a Count value of 2. Trigger Type of Force was set to a Trigger Force value of 5.0 g. Each hydrogel plug was placed directly underneath the TA probe and "Start Test" was selected. "Up" and "Fast" buttons were selected where the height needed to be adjusted to a higher setting to accommodate the plug. Three (3) plugs per recipe were tested. Results for absolute positive force, absolute positive distance, peak force, and positive area were collected. These parameters then can result in cohesiveness measurements (the hydrogel's ability to return to original height after compression), hardness (the maximum force of the gel), and springiness (tested twice with compressive force, Force2/Force1×100%).

The following Table shows the results for the HYP-1689 batch

| Test ID | Abs. (+) Force (Cycle: 1) | Abs. (+) Force (Cycle: 2) | Abs. (+) Dist. (Cycle: 1) | Abs. (+) Dist. (Cycle: 2) | Peak Force (Cycle: 1) | Peak Force (Cycle: 2) | (+) Area (Cycle: 1) | (+) Area (Cycle: 2) | Cohesiveness (%) | Springiness (%) |
|---|---|---|---|---|---|---|---|---|---|---|
| 1 | 363.431 | 348.541 | 12.86 | 12.86 | 363.431 | 348.541 | 1238.541 | 993.425 | | |
| 2 | 360.924 | 346.426 | 12.815 | 12.815 | 360.924 | 346.426 | 1206.967 | 990.701 | | |
| 3 | 362.681 | 348.504 | 12.785 | 12.785 | 362.681 | 348.504 | 1227.357 | 991.402 | | |
| 4 | 354.242 | 338.274 | 12.833 | 12.833 | 354.242 | 338.274 | 1195.327 | 961.167 | | |
| 5 | 360.824 | 344.455 | 12.785 | 12.785 | 360.824 | 344.455 | 1225.045 | 976.93 | | |
| HYP-1689 | | | | | | | | | 80.64% | 100.00% |
| Avg: | 360.421 | 345.24 | 12.816 | 12.816 | 360.421 | 345.24 | 1218.647 | 982.725 | | |
| S.D. | 3.632 | 4.246 | 0.032 | 0.032 | 3.632 | 4.246 | 17.268 | 13.709 | | |
| Coef. of Variation | 1.008 | 1.23 | 0.251 | 0.251 | 1.008 | 1.23 | 1.417 | 1.395 | | |

Example 19: Taking PH and Electroconductivity (EC) Measurements

Taking the Electrical Conductivity (EC) and pH of a Gel Plug pH was calibrated with known standards (4.01 and 7.00) in separate beakers. A temperature and pH probe were added to the one beaker and stirred gently until the pH meter was reached and leveled. The meter was thoroughly rinsed with RO water and repeated with the other standard in the other beaker.

The hydrogels were measured by pressing and mashing 5-6 hydrogel plugs in a bag. The temperature and pH probe were inserted into the bags containing the mashed plugs and were gently stirred until the indication sound on the pH meter was activated. pH was recorded and the meter was rinsed with RO water.

EC was measured using the same mashed plugs (5-6 hydrogel plug) by opening the EC probe program, adding the EC probe to the mashed plugs and ensuring gel was surrounding the electrodes and recording the measurement once leveled. The EC probe was then rinsed with RO water.

Example 20: Taking HS-GC Measurements

Headspace gas chromatography to confirm the absence of residual solvents in the starting kappa-carrageenan. Samples were tested using headspace GC and found that none of the samples contained any residual solvents. The total amount of volatiles was very low in the samples. Sometimes, hydrocarbons and siloxanes were observed. These could be classified as greases, probably from the machines used to press the carrageenan.

More particularly, polysaccharide samples were submitted as powders in plastic vials. The objective of the testing was to evaluate the samples for residual solvents. Direct Injection (DI)-Gass Chromatography/Mass Spectroscopy (GC/MS) were done.

The sample was placed into a tared 20 mL headspace vial and weighed. The vial was immediately sealed and placed onto an Agilent Technologies 7697A Headspace Sampler to outgas where the gasses within the headspace vial were analyzed using a Hewlett Packard 6890 Gas Chromatograph/5973 Mass Selective Detector.

A blank was analyzed prior to the sample analysis to ensure that the system did not contain any compounds of interest, which it did not.

An external standard (0.05 pL of isopropyl alcohol) was analyzed in duplicate following the sample analysis. The average response from the external standard injections was used to quantify the individual compounds identified in each sample.

The outgas temperature and time were 92° C. and one (1) hour with approximately 0.1 gram.

None of the samples exhibited any evidence of the presence of any kind of solvents. The total outgassing was really low and showed the presence of hydrocarbons and sometimes siloxanes. The complete results are listed in Table 1 included with this report. The compounds identified in each sample were quantified based on the average response of the two external standard (mixture) injections performed following the sample analysis.

The compounds seen in the blank are listed above the results. Those compounds that were seen in the blank are shown in bold in the sample table. Those compounds which had a response less than or equal to what was seen in the blank were denoted with an asterisk (*) and were NOT included in the totals.

The relative percent of each compound is listed along with the retention time, response, and match quality. The relative percent is computed by dividing the individual compound response by the total outgassing response for the sample and the resultant multiplied by one hundred (100).

A match quality was assigned to each compound identified in Table 1. The match quality indicates how well the unknown spectra match that of a reference library. Values in the 90's indicate a very reliable match, 80's and 70's can be considered a fair match while anything below that should be used more as a guide as to what type of compound the unknown is.

Upon further investigation of the mass spectra at each retention time it was noticed that some retention times appeared to contain two co-eluting compounds. Co-eluting compounds were italicized as mixtures in the sample table and if they contained a compound of interest the response for the mixture was included in totals for that category.

The search of the mass spectrum at some of the retention times resulted in no good matches. These compounds were identified as <unknown> in the table.

Sample Characterization

| Lot | Type | Jira # |
|---|---|---|
| SRF-IS-22-3722-01 #1 | Ricogel 81137 | HYP-1677-2 |
| SRF-IS-22-3722-01 #2 | Ricogel 81137 | HYP-1677-3 |
| SRF-IS-22-3722-01 #3 | Ricogel 81137 | HYP-1677-4 |
| SRF-IS-22-3722-01 #4 | Ricogel 81137 | HYP-1677-5 |
| SRF-IS-22-3722-01 #5 | Ricogel 81137 | HYP-1677-6 |
| SRF-IS-22-3722-01 #6 | Ricogel 81137 | HYP-1677-7 |
| SRF-IS-22-3722-01 #7 | Ricogel 81137 | HYP-1677-8 |
| SRF-IS-22-3722-01 #8 | Ricogel 81137 | HYP-1677-9 |
| SRF-IS-22-3722-01 #9 | Ricogel 81137 | HYP-1677-10 |
| SRF-IS-22-3722-01 #10 | Ricogel 81137 | HYP-1677-11 |
| 211012C | Ricogel 8800 | HYP-1677-1 |

Example 21: Karl Fisher Testing

Water Content of Starting Kappa Carrageenan

Karl Fischer Method of Moisture Determination for moisture in liquids, or small amounts of moisture in prepared solids.

The Water Determination Test (Karl Fischer Method) is designed to determine the moisture content in substances, utilizing the quantitative reaction of water with iodine and sulfur dioxide, in the presence of a lower alcohol such as methanol, and an organic base such as pyridine.

There are two different determination methods in the iodine-providing principle: the volumetric titration method and the coulometric titration method.

In the volumetric titration method, the iodine required for a reaction with water, is previously dissolved in water, and the moisture content in the sample is determined by measuring the amount of iodine consumed as a result of a reaction with water in the sample.

The apparatus for volumetric titrations, consists of an automatic burette, a back titration flask, a stirrer, and equipment for amperometric titration at constant voltage, or potentiometric titration at constant current.

The apparatus for coulometric titration is comprised of an electrolytic cell for iodine production, a stirrer, a titration flask, and a potentiometric titration system at constant current. The iodine production device is composed of an anode and a cathode, separated by a diaphragm. The anode is immersed in the analyte solution, and the cathode is immersed in the catholyte solution. Both electrodes are usually made of platinum-mesh. This volumetric technique involves dissolving the sample in a suitable solvent and adding measured quantities of a reagent.

In the coulometric titration method, first, iodine is produced by electrolysis of a reagent containing the iodide ion, and then, the moisture content in the sample is determined by measuring the quantity of electricity which is required for the electrolysis (i.e., for the production of generated iodine), based on the quantitative reaction of the generated iodine with water.

It will be understood that various details of the presently disclosed subject matter may be changed without departing from the scope of the presently disclosed subject matter. Furthermore, the foregoing description is for the purpose of illustration only, and not for the purpose of limitation.

All publications, patents, and patent applications cited in this specification are incorporated herein by reference for the teaching to which such citation is used.

Tested embodiments described herein represent exemplary embodiments.

The specific responses observed may vary according to and depending on the particular hydrogel formulation, as well as the type of formulation and mode of administration employed, and such expected variations or differences in the results are contemplated in accordance with practice of the present disclosure.

Although specific embodiments of the present disclosure are herein illustrated and described in detail, the disclosure is not limited thereto. The above detailed descriptions are provided as exemplary of the present disclosure and should not be construed as constituting any limitation of the disclosure. Modifications will be obvious to those skilled in the art, and all modifications that do not depart from the spirit of the disclosure are intended to be included with the scope of the appended claims.

We claim:

1. A method of preparing a horticultural hydrogel plug comprising the steps of:
   mixing carrageenan, fertilizer, and, optionally, carbon and microcrystalline cellulose to form a mixture;
   heating the mixture to at least 85° C. while mixing to form a homogeneous mixture;
   cooling the homogeneous mixture to less than 70° C.; and
   pouring the homogeneous mixture into a gel plug mold to form a horticultural hydrogel plug,
   wherein the horticultural hydrogel plug includes:
      0.8% to 1.7% carrageenan;
      96% to 99% water;
      0.1% to 0.2% fertilizer;
      optionally, 0.01% to 0.1% microcrystalline cellulose; and
      optionally, 0.005% to 0.015% acid
   wherein the horticultural hydrogel plug includes:
      hardness of more than 150 g/cm$^2$;
      electrical conductivity of 2.3 to 8.5 mS/cm; and
      a pH between 5.2 and 8.5.

2. The method of claim 1, further comprising the step of adjusting the pH with citric acid or phosphoric acid.

3. A horticultural hydrogel plug prepared according to a method of comprising the steps of:
   mixing carrageenan, fertilizer, and, optionally, carbon and microcrystalline cellulose to form a mixture;
   heating the mixture to at least 85° C. while mixing to form a homogeneous mixture;
   cooling the homogeneous mixture to less than 70° C.; and
   pouring the homogeneous mixture into a gel plug mold to form a horticultural hydrogel plug,
   wherein the horticultural hydrogel plug includes:
      0.8% to 1.7% carrageenan;
      96% to 99% water;
      0.1% to 0.2% fertilizer;
      optionally, 0.01% to 0.1% microcrystalline cellulose; and
      optionally, 0.005% to 0.015% acid
   wherein the horticultural hydrogel plug includes:
      hardness of more than 150 g/cm$^2$;
      electrical conductivity of 2.3 to 8.5 mS/cm; and
      a pH between 5.2 and 8.5.

4. The horticultural hydrogel plug of claim 3, wherein the horticultural hydrogel plug is suitable for cultivation of kale, spinach, lettuce, or bok choy.

5. The horticultural hydrogel plug of claim 3, wherein the horticultural hydrogel plug is suitable for cultivation of a pepper, herb, berry, basil, thyme, or sage.

6. The horticultural hydrogel plug of claim 3, wherein the horticultural hydrogel plug includes 97% to 99% water.

7. The horticultural hydrogel plug of claim 3, wherein water content of the horticultural hydrogel plug remains unchanged after 90 days in ambient conditions.

8. The horticultural hydrogel plug of claim 3, wherein the horticultural hydrogel plug is freeze dried and reconstituted to have a water content of 97% to 99%.

9. The horticultural hydrogel plug of claim 3, wherein the horticultural hydrogel plug is frozen to below 32° F. and thawed to at least 65° F. at least one time.

10. The horticultural hydrogel plug of claim 3, wherein the horticultural hydrogel plug may lose water content such that a new water content is 60% and may be rehydrated to a water content of 97% to 99%.

* * * * *